US011938497B2

(12) United States Patent
Kieffer et al.

(10) Patent No.: US 11,938,497 B2
(45) Date of Patent: Mar. 26, 2024

(54) SMART CONTROL OF A SPRAY SYSTEM

(71) Applicant: Wagner Spray Tech Corporation, Plymouth, MN (US)

(72) Inventors: Joseph W. Kieffer, Chanhassen, MN (US); Lam Huu Nguyen, Woodbury, MN (US); Jeshwanth Durga Sagar Kundem, Minneapolis, MN (US); Xiaogang Luo, Eden Prairie, MN (US); Jan Barthelmes, Salem (DE); Nima Abbaspour, Salem (DE)

(73) Assignee: Wagner Spray Tech Corporation, Plymouth, MN (US)

( * ) Notice: Subject to any disclaimer, the term of this patent is extended or adjusted under 35 U.S.C. 154(b) by 399 days.

(21) Appl. No.: 16/744,778

(22) Filed: Jan. 16, 2020

(65) Prior Publication Data

US 2020/0230632 A1 Jul. 23, 2020

Related U.S. Application Data

(60) Provisional application No. 62/874,262, filed on Jul. 15, 2019, provisional application No. 62/794,255, filed on Jan. 18, 2019.

(51) Int. Cl.
*B05B 12/08* (2006.01)
*B05B 11/10* (2023.01)
*B05B 12/12* (2006.01)

(52) U.S. Cl.
CPC .............. *B05B 12/08* (2013.01); *B05B 11/10* (2023.01); *B05B 12/12* (2013.01)

(58) Field of Classification Search
None
See application file for complete search history.

(56) References Cited

U.S. PATENT DOCUMENTS 4,355,761 A 10/1982 Bjorn et al.
5,381,962 A * 1/1995 Teague .................... B08B 3/026 239/525
5,718,767 A 2/1998 Crum et al.
(Continued)

FOREIGN PATENT DOCUMENTS

CN 109070123 A 12/2018
JP H0631214 A 2/1994
(Continued)

OTHER PUBLICATIONS

International Search Report and Written Opinion for International Patent Application No. PCT/US2020/033588, dated Aug. 31, 2020, filing date of May 19, 2020, 15 pages.
(Continued)

*Primary Examiner* — Charles Capozzi
(74) *Attorney, Agent, or Firm* — Christopher J. Volkmann; Kelly, Holt & Christenson, PLLC

(57) ABSTRACT

A fluid spraying system includes a fluid applicator having a tip that atomizes a fluid. The fluid spraying system also includes a pump configure to pump the fluid from a fluid source to the tip and a control system. The control system identifies at least one characteristic of the tip or the fluid and communicatively couples to the pump. The control system also controls an operating characteristic of the fluid spraying system based on a characteristic of the tip or the fluid.

24 Claims, 28 Drawing Sheets

(56) References Cited

U.S. PATENT DOCUMENTS

| | | | | |
|---|---|---|---|---|
| 6,758,423 | B1 | 7/2004 | Perkins et al. | |
| 9,937,663 | B1 * | 4/2018 | Goss | B29C 64/295 |
| 10,356,085 | B2 | 7/2019 | Shanks et al. | |
| 10,434,525 | B1 * | 10/2019 | Cooper | B05B 7/0815 |
| 2005/0011967 | A1 * | 1/2005 | Skelton-Becker | G05B 23/0283<br>239/101 |
| 2005/0048196 | A1 * | 3/2005 | Yanagita | B05B 12/085<br>427/421.1 |
| 2010/0077959 | A1 | 4/2010 | Treloar et al. | |
| 2011/0216188 | A1 | 9/2011 | Thwing et al. | |
| 2014/0061329 | A1 * | 3/2014 | Ngo | B05B 9/06<br>239/11 |
| 2014/0074970 | A1 * | 3/2014 | Nielsen | G01C 15/06<br>709/217 |
| 2014/0079652 | A1 | 3/2014 | Cooper et al. | |
| 2015/0088434 | A1 * | 3/2015 | Grabau | G01M 99/008<br>702/34 |
| 2015/0277574 | A1 | 10/2015 | Jain et al. | |
| 2015/0375247 | A1 * | 12/2015 | Funseth | B05B 1/20<br>239/69 |
| 2015/0378371 | A1 | 12/2015 | Lange et al. | |
| 2017/0110898 | A1 | 4/2017 | Kyriakoulis et al. | |
| 2017/0129605 | A1 * | 5/2017 | Wu | A01M 7/00 |
| 2017/0203309 | A1 * | 7/2017 | Krueger | A01M 7/006 |
| 2017/0252771 | A1 | 9/2017 | Young, II | |
| 2017/0254055 | A1 | 9/2017 | Xia | |
| 2017/0259290 | A1 | 9/2017 | Kraft et al. | |
| 2017/0274413 | A1 | 9/2017 | Vo et al. | |
| 2018/0071792 | A1 | 3/2018 | Spengler et al. | |
| 2018/0192167 | A1 | 7/2018 | Lange et al. | |
| 2018/0193864 | A1 | 7/2018 | Plantard et al. | |
| 2018/0292847 | A1 | 10/2018 | Lange et al. | |
| 2019/0022678 | A1 | 1/2019 | Donaldson | |
| 2019/0047009 | A1 | 2/2019 | Barker et al. | |
| 2019/0100425 | A1 | 4/2019 | Paar et al. | |
| 2019/0105676 | A1 | 4/2019 | Kahler et al. | |
| 2019/0210726 | A1 | 7/2019 | Wu et al. | |
| 2019/0247873 | A1 * | 8/2019 | Schulze | G01P 3/486 |
| 2019/0283062 | A1 * | 9/2019 | De Talhouet | B05C 11/1023 |
| 2019/0384329 | A1 * | 12/2019 | Cybulsky | G05B 13/024 |
| 2020/0001313 | A1 * | 1/2020 | Bindl | B05B 12/006 |
| 2020/0009594 | A1 * | 1/2020 | Wood | B05B 12/085 |
| 2020/0034622 | A1 | 1/2020 | Thakurta et al. | |
| 2020/0042095 | A1 | 2/2020 | Ang et al. | |
| 2020/0050223 | A1 | 2/2020 | Lange et al. | |
| 2020/0121860 | A1 | 4/2020 | Uber, III et al. | |
| 2021/0271272 | A1 | 9/2021 | Vo et al. | |
| 2022/0046340 | A1 | 2/2022 | Lange et al. | |
| 2022/0050484 | A1 | 2/2022 | Lange et al. | |
| 2022/0066482 | A1 | 3/2022 | Lange et al. | |
| 2022/0100214 | A1 | 3/2022 | Lange et al. | |

FOREIGN PATENT DOCUMENTS

| | | | |
|---|---|---|---|
| JP | 2000-246167 | A | 9/2000 |
| KR | 10-2008-0046756 | A | 5/2008 |
| KR | 10-0926377 | B1 | 11/2009 |
| WO | WO 2011006933 | A1 | 1/2011 |

OTHER PUBLICATIONS

International Search Report and Written Opinion for International Patent Application PCT/US2020/013876, dated Jun. 5, 2020, date of filing: Jan. 16, 2020, 12 pages.

Non-Final Office Action for U.S. Appl. No. 15/931,766 dated Feb. 2, 2022, 17 pages.

First Office Action for Chinese Patent Application No. 202080009522.1 dated May 11, 2022, 18 pages with English Translation.

Non-Final Office Action for U.S. Appl. No. 15/931,766 dated Feb. 17, 2021, 20 pages.

International Preliminary Report on Patentability for International Patent Application No. PCT/US2020/013876, dated Jul. 29, 2021, 9 pages.

Application and Drawings for U.S. Appl. No. 15/931,766, filed May 14, 2020, 40 pages.

Prosecution History for U.S. Appl. No. 15/931,766 including: Final Office Action dated Jul. 20, 2021, and Amendment filed Jun. 15, 2021, 33 pages.

Search Report for European Patent Application No. 20741192.7 dated Sep. 19, 2022, 12 pages.

Second Office Action for Chinese Patent Application No. 202080009522.1 dated Dec. 8, 2022, 17 pages with English Translation.

First Office Action for Chinese Patent Application No. 202080063274.9 dated Nov. 23, 2022, 19 pages with English Translation.

Third Office Action for Chinese Patent Application No. 202080009522.1, dated Apr. 29, 2023, 18 pages including English Translation.

Gan Yong, "800 Questions on Steelmaking—Continuous Casting New Technology", Beijing: Metallurgical Industry Press, pp. 435-436, Sep. 2003, 4 pages.

Liu Rensheng et al. :5000 Questions on New Technologies of Energy Saving and Emission Reduction in Iron and Steel Industry in Ironmaking System Beijing: China Science and Technology Press, pp. 378-379, Jul. 2009, 7 pages.

Office Action for Chinese Patent Application No. 2020800095221, dated Dec. 20, 2023, 17 pages including English translation. CN1321549 corresponds to U.S. Pat. No. 6,758,423 already cited. CN106999971 corresponds to US2017259290 already cited. CN107666847 corresponds to US2018071792 already cited. CN109070123 corresponds to US2017252771 already cited.

* cited by examiner

FIG. 11D
1:35
90%
Choose Tip
50%
TIP 517
CHANGE TIP
NEXT

SMART CONTROL OF A SPRAY SYSTEM

CROSS-REFERENCE TO RELATED APPLICATION

The present application is based on and claims the benefit of U.S. provisional patent application Ser. No. 62/874,262, filed on Jul. 15, 2019, and U.S. provisional patent application Ser. No. 62/794,255, filed on Jan. 18, 2019 the contents of which are hereby incorporated by reference in their entirety.

BACKGROUND

In a fluid spraying system, different fluids (e.g., different types of paints, etc.) have different physical properties that affect atomization rates, and spray patterns. Additionally, different spray tips used by the spraying system have different properties that affect atomization rates, and atomization patterns.

The discussion above is merely provided for general background information and is not intended to be used as an aid in determining the scope of the claimed subject matter. The claimed subject matter is not limited to implementations that solve any or all disadvantages noted in the background.

SUMMARY

A fluid spraying system includes a fluid applicator having a tip that atomizes a fluid. The fluid spraying system also includes a pump configure to pump the fluid from a fluid source to the tip and a control system. The control system identifies at least one characteristic of the tip or the fluid and communicatively couples to the pump. The control system also controls an operating characteristic of the fluid spraying system based on a characteristic of the tip or the fluid.

These and various other features and advantages will be apparent from a reading of the following Detailed Description. This Summary and Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

Figure 1:
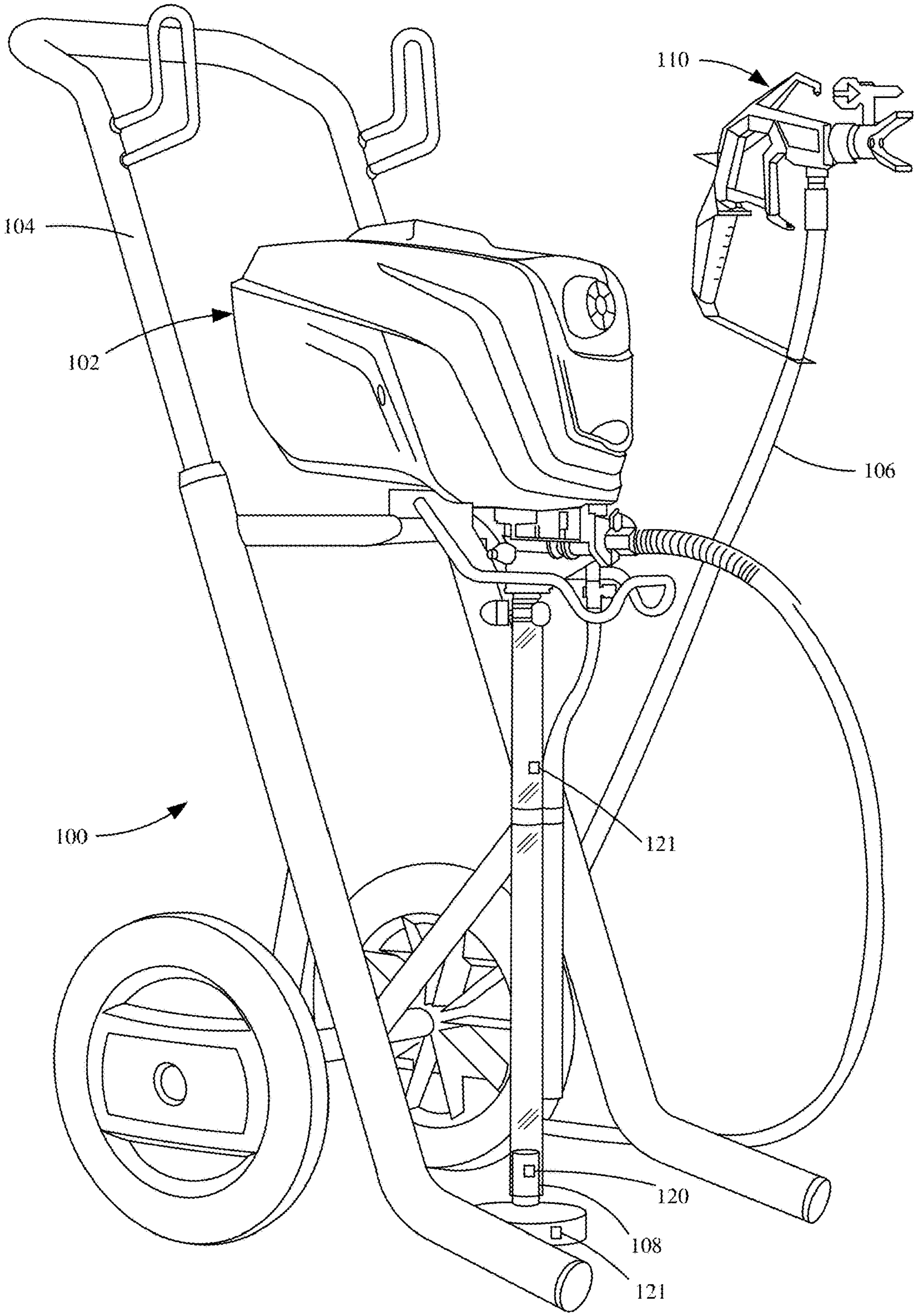
FIG. 1 is a perspective view showing one example spraying system.

While the above-identified figures set forth one or more examples of the disclosed subject matter, other examples are also contemplated, as noted in the disclosure. In all cases, this disclosure presents the disclosed subject matter by way of representation and not limitation. It should be understood that numerous other modifications and examples can be devised by those skilled in the art which fall within the scope and spirit of the principles of this disclosure.

DETAILED DESCRIPTION

Different fluids have different physical properties that affect atomization rates, and atomization patterns. Additionally, different spray tips have different properties that affect atomization rates, and atomization patterns. For the average consumer using a spraying system, determining which conditions are necessary for achieving an even spray pattern (e.g., a spray pattern free of tailing effects) can be difficult. Accordingly, one example spraying system includes features that detect (automatically or with some user input) the current tip and/or the current fluid being sprayed. For instance, the fluid can be identified fully automatically by using a sensor in the fluid and the tip can be identified by automatically reading an RFID tag (or other type of tag) in the tip when the tip is inserted into the applicator or by placing the tip near a sensor associated with the pump. Alternatively or in addition, the tip can be identified semi-automatically by having the user scan a machine readable (MR) code (such as a barcode, Quick Response (QR) code, image recognition, etc.) on the tip, tip package, etc. and the fluid can be identified semi-automatically by scanning a bar code on a fluid source (e.g., the fluid bucket, etc.). In some examples, the user can use a separate device, such as a mobile device to scan these codes.

Using tip and fluid identification information, the spraying system can be improved to produce desired spraying characteristics. For instance, changing pump settings based on tip size/geometry and fluid characteristics to get desired atomization rates/spray patterns. In some examples, the improvement occurs automatically through automatic adjustment of pump settings. In other examples, the improvement is recommended to the operator, such that they can manually accept or reject the recommended changes.

As a tip wears, or otherwise ages, the characteristics of the tip (e.g., the spray pattern shape/size, flowrate, internal turbulation, etc.) can change. For example, a new tip may dispense twenty ounces per minute (oz/min), while that same tip, after some usage, may dispense twenty-two oz/min. For consistent or otherwise improved spray coverage, examples of the present system accounts for wear affects, for example by adjusting a characteristic of the pump operation. In some examples, the diameter of the tip orifice can be calculated based on the sensed pressure, pump RPM, pump displacement, etc. Additionally, a "life" of the tip can be determined by comparing a current tip's orifice size to the tip's initial orifice size (e.g., 100% tip life) and an unacceptably worn tip orifice size (e.g., 0% tip life).

FIG. 1 is a perspective view showing one example spraying system 100. Spraying system 100 includes a pump 102 that is mounted on a cart 104 and couples to an applicator 110 through a delivery line 106. Pump 102 includes a fluid intake 108 that is exposed to a fluid source (e.g., a five-gallon bucket of paint). Pump 102 pumps the fluid from the fluid source through fluid intake 108 and pumps the fluid at a given pressure to applicator 110 through delivery line 106. A fluid sensor 120 can be mounted on fluid intake 108 to sense a type of fluid (e.g., a type of paint). Examples of fluid sensors 120 will be described in greater detail below. Alternatively, or in addition, a fluid level sensor 121 can sense the amount of remaining fluid in the fluid source (via ultrasound, pressure, etc.). When the fluid reaches a threshold level a user can be notified. For example, an alert on a remote/mobile device may notify the user. As another example, a haptic, visual or audible alert on the applicator may notify the user. The fluid level sensor 121 may also track usage over time and notify a user at given intervals. For example, a user may want to be notified when they have three-quarters remaining, one half remaining, one-quarter remaining, etc. This may be useful in helping a user maintain an even coat of fluid coverage over a large spraying job.

In some examples, an electronic device (e.g., smart phone, tablet, PC, etc.) can interface with the pump through a wired or wireless connection. The electronic device can also provide a user interface for a user to control and/or monitor operations of the spraying system 100. For example, setting fluid pressure, entering cleaning mode, tracking fluid throughput, etc. In some examples, water being pumped through spraying system 100 to clean the system is detected and not counted as fluid throughput.

An internet or other network connection of the electronic device can be used to update the software/firmware of the spraying system 100. In other examples, spraying system 100 can directly connect to the internet or another network.

Figure 2:
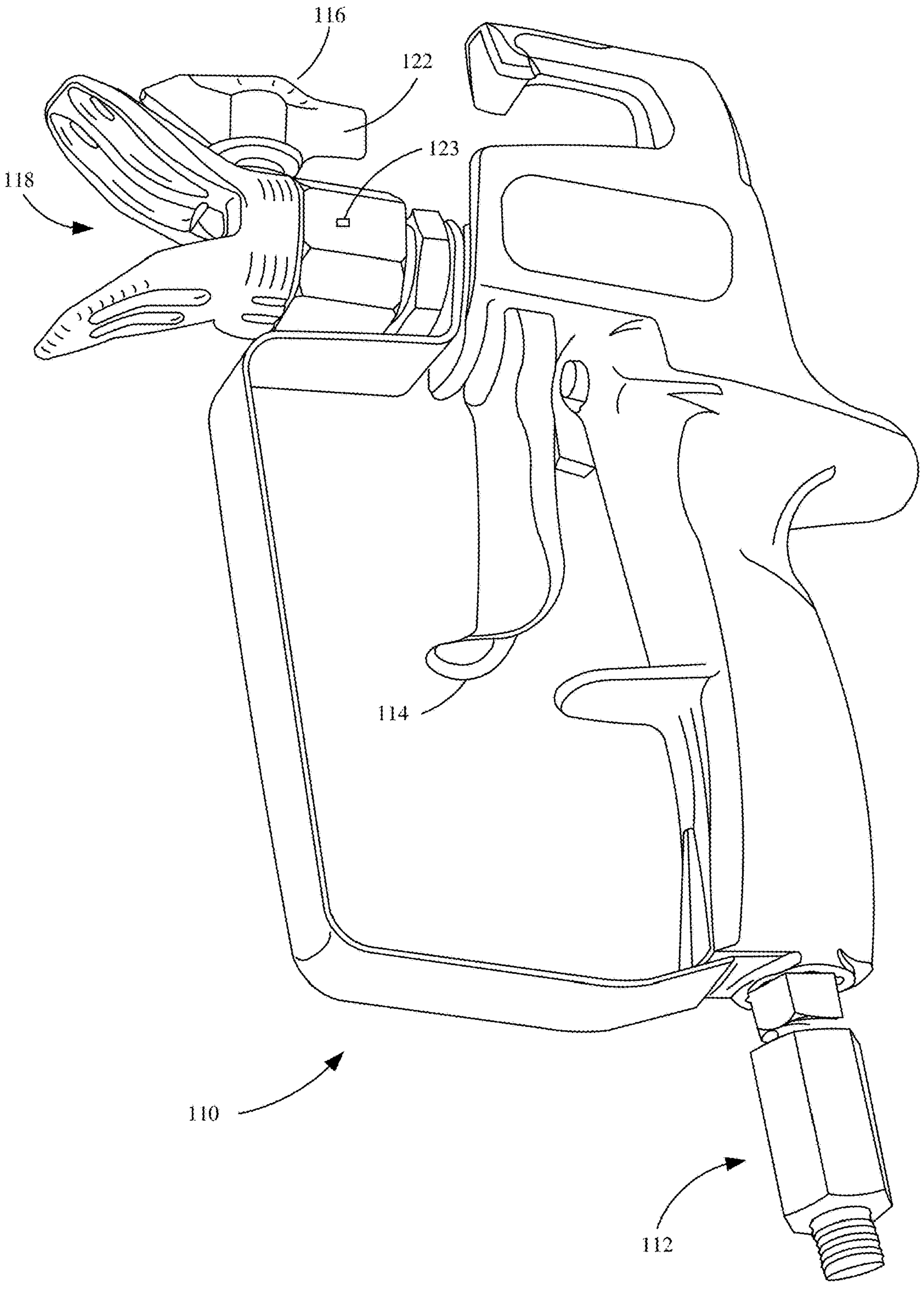
FIG. 2 is a perspective view showing one example fluid applicator.

FIG. 2 is a perspective view showing one example fluid applicator 110. Fluid applicator 110 can be similar to the fluid applicator of FIG. 1 or can be a different type of fluid applicator as well. Applicator 110 receives fluid through an inlet 112 (for example from delivery line 106 and then into and through inlet 112). Trigger 114 actuates to allow fluid flow from inlet 112 to an outlet 118 of tip 116 where the fluid is expelled. Often, tip 116 can be replaced with a different type of tip for a different spray pattern or to accommodate a different fluid.

In some cases, tip 116 can include an identifier 122 that is read by a tip sensor 123 coupled to applicator 110. Of course, a different tip sensor 123 could also read identifier 122 as well. Identifier 122 can be a form of RFID tag or similar electronic devices. Tip sensor 123 can be an RFID or other electronic reader that reads the identifier 122 of tip 116 when the objects are within close proximity to each other (e.g., when tip 116 is inserted into applicator 110).

Identifier 122 could be a different type of device, such as a mechanical device. For example, identifier 122 could be a specific profile of tip 116 that contacts a different part of tip sensor 123 based on the type of tip 116 (e.g., each tip would have a unique profile that could be detected by tip sensor 123). Identifier 122 could be a different device as well, such as electronic leads that contact leads (tip sensor 123) on applicator 110. Identifier 122 could include other items as well to transmit identifying information of the tip to tip sensor 123 as well.

As shown, tip sensor 123 wirelessly transmits the tip data to a pump controller. In another example, tip sensor 123 is coupled to a pump controller via a wired connection (e.g., a wire that runs along the length of delivery line 106).

In some examples, an optical sensor can be disposed on fluid applicator 110 (or elsewhere that can sense the fluid being expelled from fluid applicator 110) to sense changes in the spray pattern. For instance, as a tip wears, the pattern it generates can narrow or being to spit. The narrowing or spitting in the pattern can be detected by the optical sensor.

Figure 3:
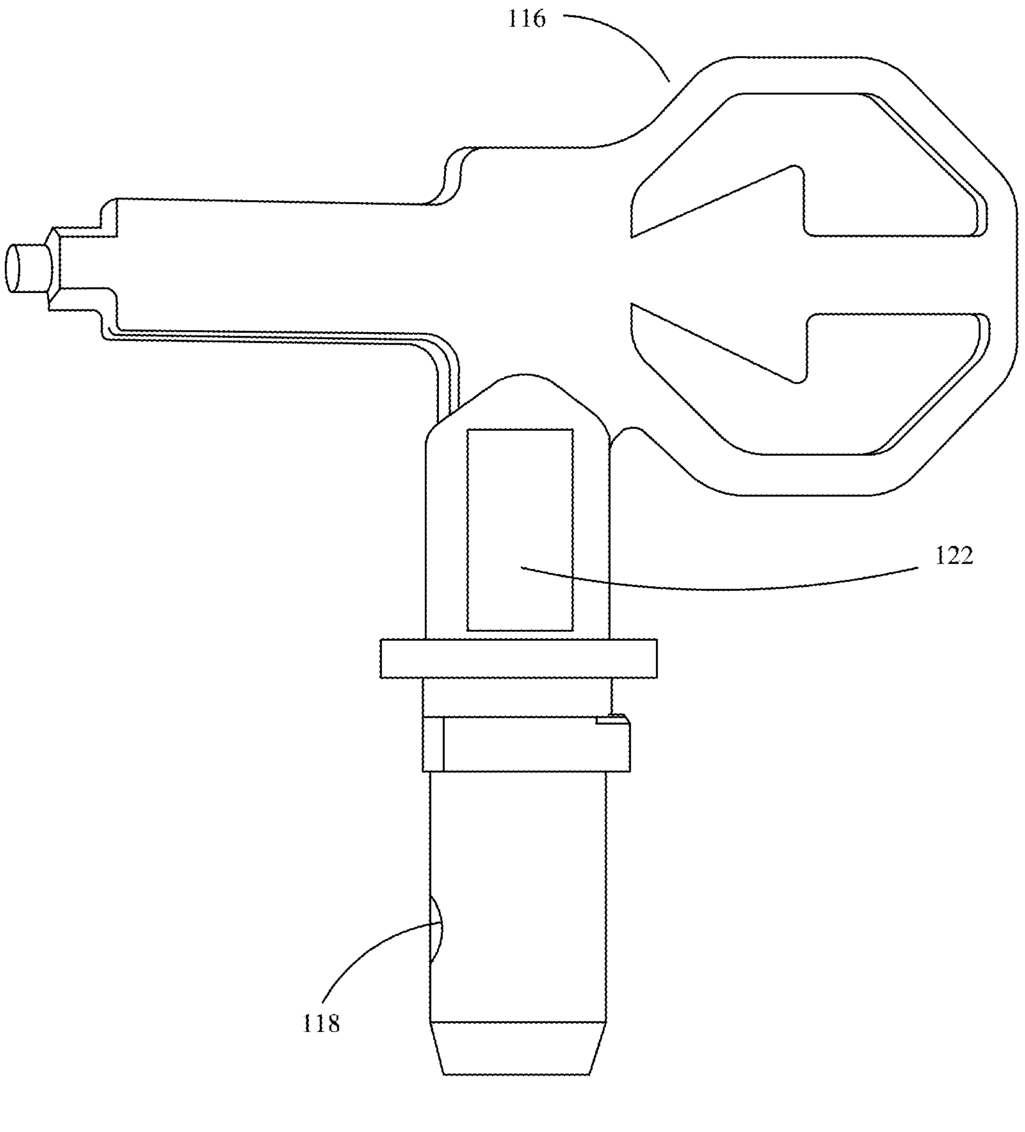
FIG. 3 is a side view showing one example tip.

FIG. 3 is a side view showing one example tip 116. Tip 116, as shown, includes an identifier 122 that is an RFID tag. In this case, identifier 122 interacts with tip sensor 123 that is an RFID reader. Tip 116 also has an outlet 118 where paint is expelled from. Each different kind of tip 116 can have a different outlet 118 (and/or internal geometry) that has characteristics that affect the fluid spray expelled from outlet 118. Because each tip 116 may have different spray characteristics, it is important to know which tip 116 is being used to better control the fluid spray from applicator 110. In some examples, tip 116 has keying features to prevent the tip from being inserted into a pump system that is not configured to electronically interact with, or detect tip 116 (referred to as a "non-smart" pump system). However, in other examples, tip 116 can be inserted into a non-smart pump system and when re-inserted into a smart pump system, the wear from the non-smart pump usage can be estimated, for instance, by calculating the diameter of outlet 118.

Figure 4:
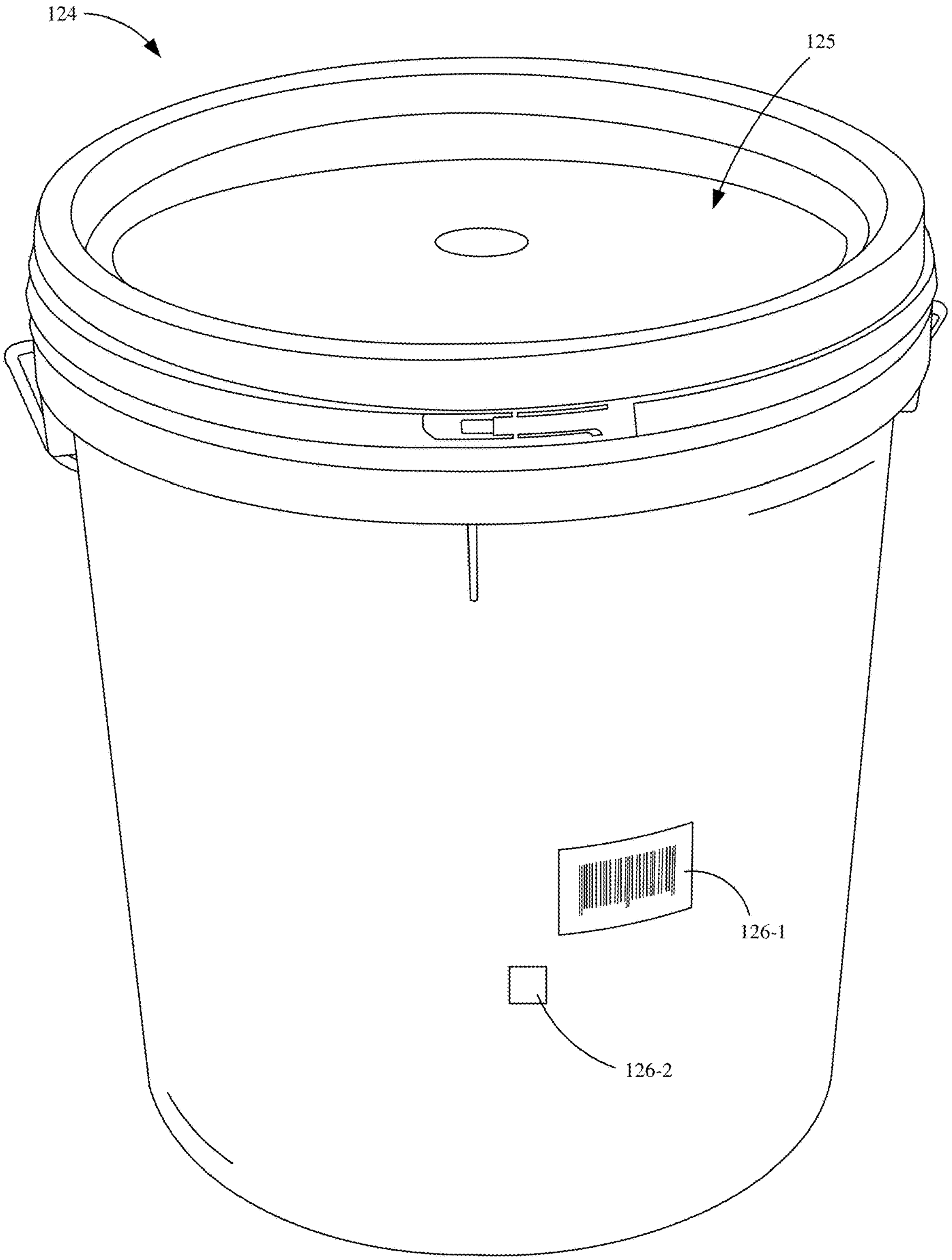
FIG. 4 is a perspective view showing one example fluid source.

FIG. 4 is a perspective view showing one example fluid source 124. Fluid source 124 has a fluid reservoir 125 and one or more identifiers 126. Identifier 126-1 includes a machine readable code (e.g., a bar code) that is commonly placed on buckets of fluid. In one example, a device can scan identifier 126-1 and identify the fluid within fluid source 124 fluid reservoir 125. Identifier 126-2 includes an RFID tag that is read by an RFID reader (such as fluid sensor 120 located on fluid intake 108 in FIG. 1). Of course, identifiers 126-1 and 126-2 are examples only and other identifiers 126 could be used to identify the fluid as well. For instance, a device can take a picture of fluid source 124 and identify the fluid based on the image (e.g., by identifying brand markings, optical character recognition of the words on the source, etc.).

Figure 5:
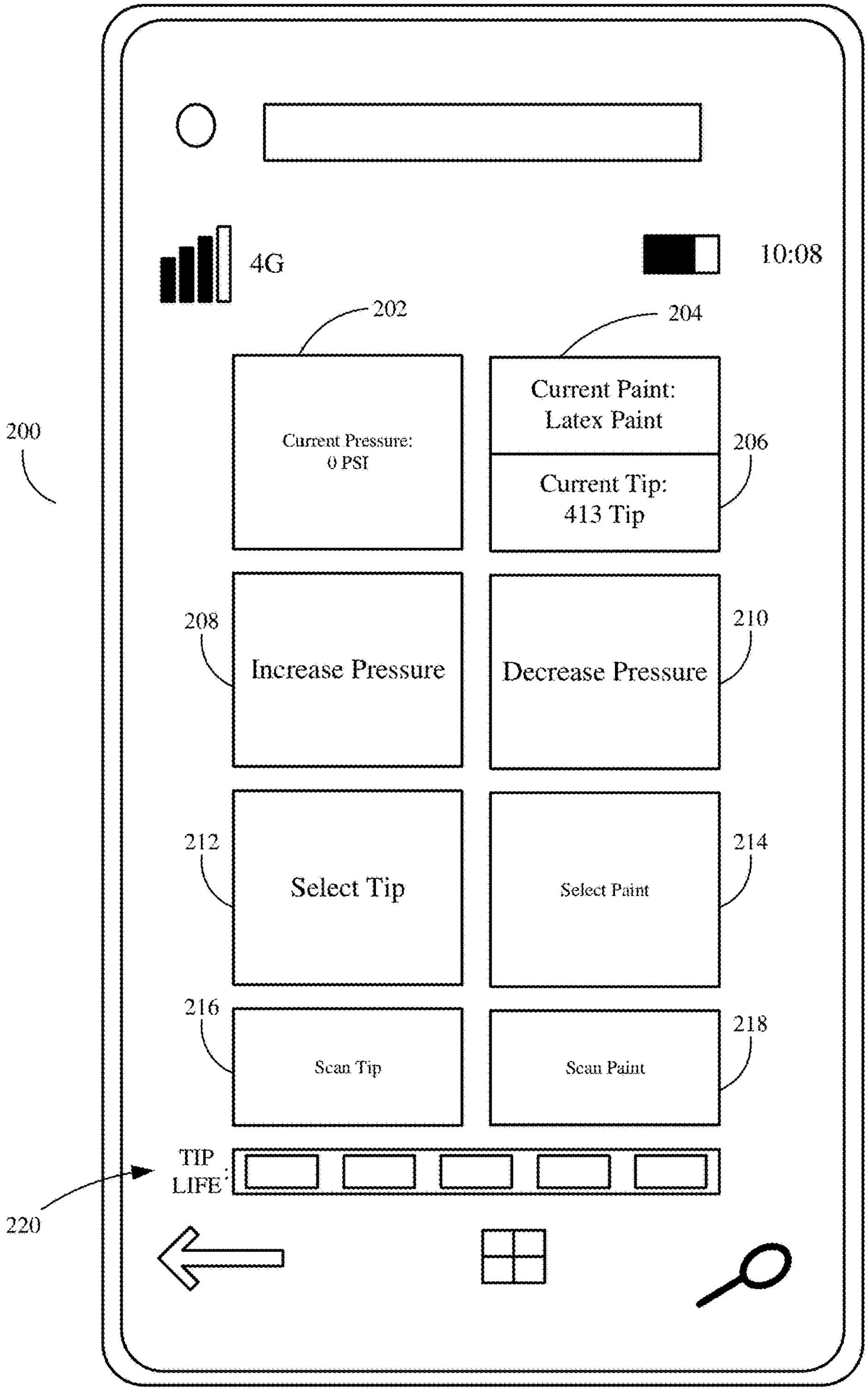
FIG. 5 is a diagram showing an example interface device.

FIG. 5 is a diagram showing an example interface 200. As shown, interface 200 is displayed on a smart phone, however in other examples interface 200 can be displayed on a different device as well. For example, interface 200 could be located on applicator 110, pump 102 a handheld device, a watch, an eye wear, or somewhere else.

Interface 200, as shown, includes pressure indicator 202 that displays a current pressure of the fluid being pumped by the given pump. Fluid indicator 204 is a display mechanism that shows the current fluid being pumped by given pump. Tip indicator 206 is a display mechanism that displays the current tip installed in applicator 110. Pressure increase mechanism 208 is actuatable to increase the current pressure generated by pump 102. Pressure decreased mechanism 210 can be actuated to decrease the current pressure generated by pump 102. In other examples, there may be other actuatable mechanisms that change other settings of pump 102.

Manual tip selection mechanism 212 is actuatable to select a given tip. For example, manual tip selection mechanism 212 is actuated to generate an interface that allows a user to manually select the tip currently installed in applicator 110. Manual fluid selection mechanism 214 is actuatable to select a fluid that is to be applied by applicator 110. For example, manual fluid selection mechanism 214 can be actuated to generate an interface that allows a user to select the current fluid being pumped by pump 102. When the user selects the tip manually, the algorithm (tip life indicator) in the app can also figure out the life of the tip (like wear, flow rate, etc.) based on the pre-defined data set hard coded for each tip. Tip can also mean a nozzle.

Auto tip selection mechanism 216 is actuated to automatically sense the current tip within applicator 110. For example, the tip can be automatically selected by reading the RFID tag within the tip or some other electrical connection between the tip and a device. In another example, the tip can be automatically selected by scanning the barcode on the tip or packaging of the tip, etc.

Automatic fluid selection 218 can be actuated to automatically select the type of fluid being pumped by pump 102. For example, a sensor located in the fluid can sense a type of fluid. In another example, a barcode on the fluid storage device can be scanned to identify the type of fluid. In another example, an RFID or similar electronic mechanism can be read to identify the fluid. In another example, an application uses camera functionality on a mobile device, and the user takes a picture of the name of fluid storage device, and through image recognition the app can figure out the type of fluid.

Tip life indicator 220 displays a current remaining life of the inserted tip. This life can be calculated or estimated by the pump controller. For example, previous data gathered on the wear of certain tips that are spraying certain fluids can be used to estimate wear on the current tip. In some cases, tips can have unique identifiers that identify themselves from other tips (of the same type), this way a tip can be tracked over a given time frame even when being switched with other tips. In one example, a tip used across multiple spraying systems can have its life tracked by saving usage/spray times in combination with the unique tip identifier to a database accessible to multiple spraying systems. In one example, for each tip, the information generated on the wear, shall be saved on to the cloud and is used by the manufacturer to better estimate/understand the tip wear. The manufacturer, who has access to the tip wear data with different coatings, can use the information to better design future tips.

Figure 6:
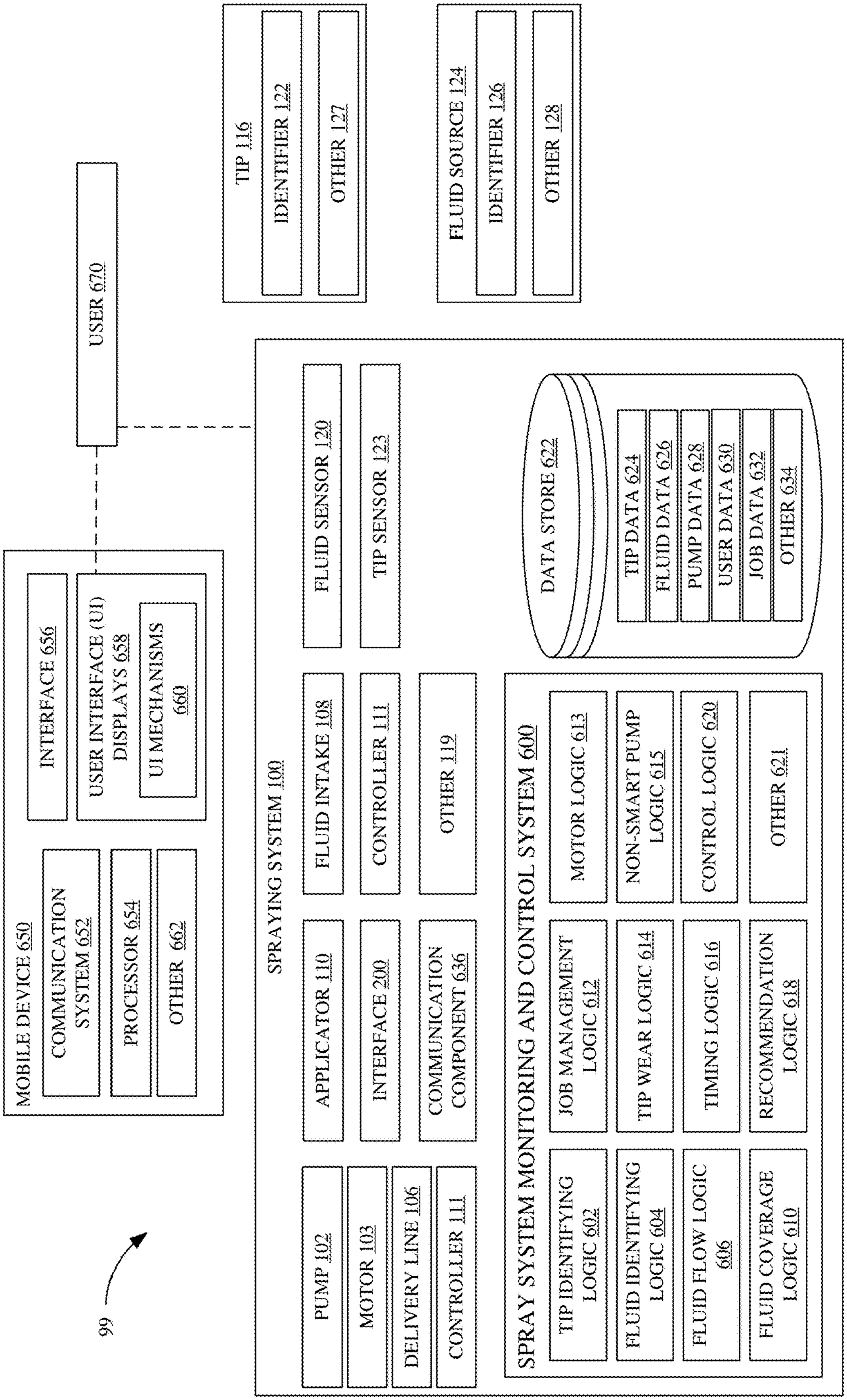
FIG. 6 is a block diagram showing an example spraying system environment.

FIG. 6 is a block diagram showing an example spraying system environment 99. For sake of illustration, but not by limitation, environment 99 will be described in the context of system 100 and similar elements are similarly numbered.

Environment 99 includes spraying system 100, tip 116, fluid source 124 and mobile device 650, but can include other items as well. Spraying system 100 includes pump 102 that pumps a fluid from fluid source 124 to applicator 110 and tip 116. System 100 includes a controller 111. In one example, controller 111 comprises a computing device, such as a microprocessor that communicatively couples to pump 102 and sends signals to pump 102 to control various aspects of operation of pump 102. For example, controller 111 monitors pump operation and controls the pump to maintain a fluid pressure in a fluid as it is pumped to applicator 110. In one example, controller 111 includes integrated software or logic components to perform a variety of different functions. For example, integrated software may be used to change the state of a solenoid in a reciprocating piston pump. Controller 111 couples to communication component 636 that allows communication with interface 200, when interface 200 is on another device, such as a smart phone or other mobile device (e.g., interface 656).

As mentioned, controller 111 can include computer processors with associated memory and timing circuitry, not separately shown. They are functional parts of the systems or devices to which they belong and are activated by, and facilitate the functionality of the other components or items in those systems.

Spraying system 100 also includes a data store 622. Data store 622 can store information associated with the pump, tip, spray gun/applicator, users, jobs, etc. For example, as a tip is used, the wear on the tip (e.g., calculated based on throughput of fluid, calculating a tip orifice diameter, etc.) can be stored with the tip identifier in data store 101 as tip data 624. As another example, the pump hours can be stored in data store 622. Data store 622 can reside on spraying system 100 or in another environment, such as a remote server.

Fluid intake 108 facilitates fluid flow from fluid source 124 to pump 102. Delivery line 106 facilitates fluid flow from pump 102 to applicator 110/tip 116. Delivery line 106 can include other items as well, such as, a communication line that facilitates data transfers from any device located on applicator 110 to pump 102. For example, data from applicator 110 can be used to set the pressure generated by pump 102 (e.g., the type of tip in applicator 110).

Interface 200 allows control of pump 102 and ultimately control of the spray pattern generated by the spraying operation. Interface 200 can be located on a housing of pump 102 or can be located remotely as well. For example, interface 200 could be on a mobile device (such as a mobile device 630) that sends control signals to pump 102 wirelessly, or through wired connection. Interface 200 could include different devices and/or mechanisms as well. Spraying system 100 can have one or more tip sensors 123 that identify the type of tip 116 and/or one or more fluid sensors 120 the type of fluid in fluid source 124. Sensors 120 and 123 can include RFID readers, barcode scanners, QR code scanners, fluid sensors, electronic leads/pins and switches, etc. Spraying system 100 can include other items as well, as indicated by block 119. Sensors 120 and 123 can be disposed in a variety of different places, for example, in or on the applicator, a mobile device, a pump, etc.

Spraying system 100 includes spray system monitoring and control system 600. Spray system monitoring and control system 600 includes various software or hardware logic components 602-621. In some examples, these components are implemented by controller 111. In other examples, these components are implemented by a different controller or processor (e.g., processor 654 or another processor located at a remote server).

Spray system monitoring and control system 600 includes tip identifying logic 602 which identifies the tip. For example, tip identifying logic 602 receives sensor signals that indicate the tip model and serial number. In one instance, tip identifying logic 602 receives sensor signals from a camera and identifies the tip based on the image (e.g., by reading a machine-readable code in the image, using optical character recognition to read a serial/model number, etc.). In another instance, tip identifying logic 602 receives sensor signals from a wireless communications sensor and identifies tip 116 based on the wireless signal (e.g., a RFID signal, a Bluetooth signal, an NFC signal, etc.). In another instance, tip identity logic 602 generates interactive components on an interface (e.g., interface 200) that enables a user to manually select a tip. In other examples, tip identifying logic 602 can identify tip 116 in other ways as well.

Fluid identifying logic 604 identifies the fluid. For example, fluid identifying logic 604 receives sensor signals that indicate the type and/or amount of paint. In one instance, fluid identifying logic 604 receives sensor signals from a camera and identifies the fluid by the image (e.g., by reading a machine-readable code in the image such as a barcode, using optical character recognition to read a part number, etc.). In another instance, fluid identifying logic 604 receives sensor signals from a wireless communications sensor and identifies fluid source 124 based on the wireless signal (e.g., a RFID signal, a Bluetooth signal, an NFC signal, etc.). In other examples, fluid identifying logic 604 can identify fluid source 124 in other ways as well.

Fluid flow logic 606 calculates or monitors fluid flow through pump 102. For instance, fluid flow logic 606 can receive sensor signals indicative of displacement of a piston within pump 102 and frequency of the piston reciprocation to calculate fluid flow. In another example, fluid flow logic 606 receives a signal from a fluid flow meter. Fluid flow logic 606 can calculate or monitor fluid flow in other ways as well.

Fluid coverage logic 610 calculates an area and thickness of fluid coverage on a surface being covered by a spraying operation. For example, fluid coverage logic 610 receives sensor signals from motion/location sensors (e.g., inertial measurement unit, gyroscope, accelerometer, proximity sensor, etc.) on an applicator and, a fluid flow rate and a spray pattern area to calculate fluid coverage. For instance, if an applicator 110 moves slower during application the coverage area will be less but the coverage thickness will be greater. Fluid coverage logic 610 can calculate an area and thickness of fluid coverage in other ways as well. Fluid coverage logic 610, in one example, can use visual aids to spatially map the covered paint area, including the ability to calculate the area of curved surfaces. Fluid coverage logic 610, in one example, can use edge detection algorithms, smoothing algorithms, and determines where fluid has or has not been applied, through color detection/light emission schemes.

Job management logic 612 generates user interface displays that a user can interact with to manage jobs. For example, a job can track information about a specific fluid operation at a worksite. Some characteristics of the job include the customer, the users completing the job, the location of the job, the fluid used on the job, the equipment (e.g., pump tip, applicator, etc.) used on the job, the time allocated to complete the job, calculating costs of job, environmental considerations etc. In one example, job management logic 612, can use pre-defined data set for over spray with a tip, to calculate the amount of over spray at the end of day. In one example, the over spray calculation, can help the occupants in deciding the safe duration to return to their space.

Tip wear logic 614 calculates the wear of tips 116 during a spraying operation. For example, tip wear logic 614 can receive information from tip identifying logic 602 as to the characteristics of the current tip 116 (e.g., the tip material, tip diameter tip orifice diameter, tip internal tip geometry, tip pressure ranges, etc.). Tip wear logic 614 can compare the standard characteristics of tip 116 (e.g., the characteristics the tip should have at manufacture) with the current detected characteristics of the tip to calculate a "tip life". For example, one relevant tip characteristic related to the tip life is the tip orifice size which can be calculated based on the flow rate, pressure, pump characteristics, etc. Comparing the tip at manufacture orifice size to the current tip orifice size and the largest acceptable orifice size can indicate a life of the tip, that is, the length of time a tip has to work effectively. In other examples, tip wear logic 614 calculates tip wear based on the amount of fluid flow that has been through tip 116 and/or the time that tip 116 has been used.

Timing logic 616 calculates and stores the time that the various components of spraying system 100 have been used. For example, pumps need to be serviced after a given amount of time and timing logic 616 keeps track of the time since the pump was last serviced. Similarly, tips need to be replaced often need to be replaced after given amount time and timing logic 616 can automatically keep track of this time.

Recommendation logic 618 generates recommendations for user 670. For example, recommendation logic 618 can receive information from tip identifying logic 602 tip wear logic 614 and fluid identifying logic 604 that indicative of the current tip and fluid being used. With this knowledge, recommendation logic 618 can give a recommendation (e.g., shown to the user on a display of a mobile device or pump) on a pressure to set for effective spraying with the current tip and fluid combination. In another example, recommendation logic 618 receives data from tip wear logic 614 and gives a recommendation to change a setting of pump 102 based on the wear of tip 116 identified by tip wear logic 614. In another example, recommendation logic 618 will give a recommendation to service pump 102 after a time of use has been received from timing logic 616. In one example, the service notifications are also stored in the cloud and the technical service personnel can have access to this information for every pump, before servicing the device. The technical service personnel can look for this information through the pump's serial number in the remote server/cloud and obtain contextual information on the pump which can aide in diagnosing and repairing procedures.

Motor logic 613 interfaces with motor 103 that controls pump 102. For example, motor logic 613 can monitor the motor temperature and send a high temperature alert. As another example, motor logic 613 can monitor the motor RPM, which normally correlates with the fluid flow and/or pressure of the fluid.

Non-smart pump logic 615 includes components to interface with a non-smart pump. For example, non-smart pump logic 615 can connect to a dongle or other device that couples to a non-smart pump to provide some smart pump features. For instance, the run-time, temperature, and RPM's of the pump could be monitored by the device and sent to the non-smart pump logic 615. In some cases, non-smart pump logic 615 can receive manual user input on pump usage from a user for the pump.

Control logic 620 generates control signals to control pump 102, motor 103 and other components of spraying system 100. For instance, control logic 620 generates a series of electrical impulses to control motor 103 to operate at a given RPM.

Datastore 622 includes tip data 624, fluid data 626, pump data 628, user data 630, job data 632 and can include other items as well, as indicated by block 634. Tip data 624 can include data on tips, for example, the tip model number, the tip serial number or other identifier, the tip life, the tip usage time, the fluids used with the tip, the tip initial dimensions, the tip current dimensions, etc. Fluid data 626 can include data on fluids, for example, the shear viscosity, extensional viscosity, rheological profile (shear rate graph), density, surface tension, preferred tip for the fluid, etc. Pump data 628 can include data on pumps, for example, the pump horsepower, the pump displacement length, the pump chamber volume, maximum and minimum effective pressure, pump operating history, etc. User data 630 can include data on users, for example, the username, the user run time, fluids used by the user, tips used by the user, pumps used by the user, etc. Job data 632 includes data on jobs, for example, the job location, the job coverage area, the job fluid thickness, the fluid type, the time on the job, the customer associated with the job, etc.

Tip 116 includes identifier 122 that is scanned or otherwise interacts with tip sensor 123 to identify the type of tip 116. Some examples of identifies 122 include serial/mode numbers, electronic ID tags, physical keying features, etc. Tip 116 can include other items as well, as indicated by block 127.

Fluid source 124 includes identifier 126 that can interact with fluid sensor 120 to identify the type of fluid in fluid source 124. Fluid source 124 can include other items as well, as indicated by block 128.

Figure 7:
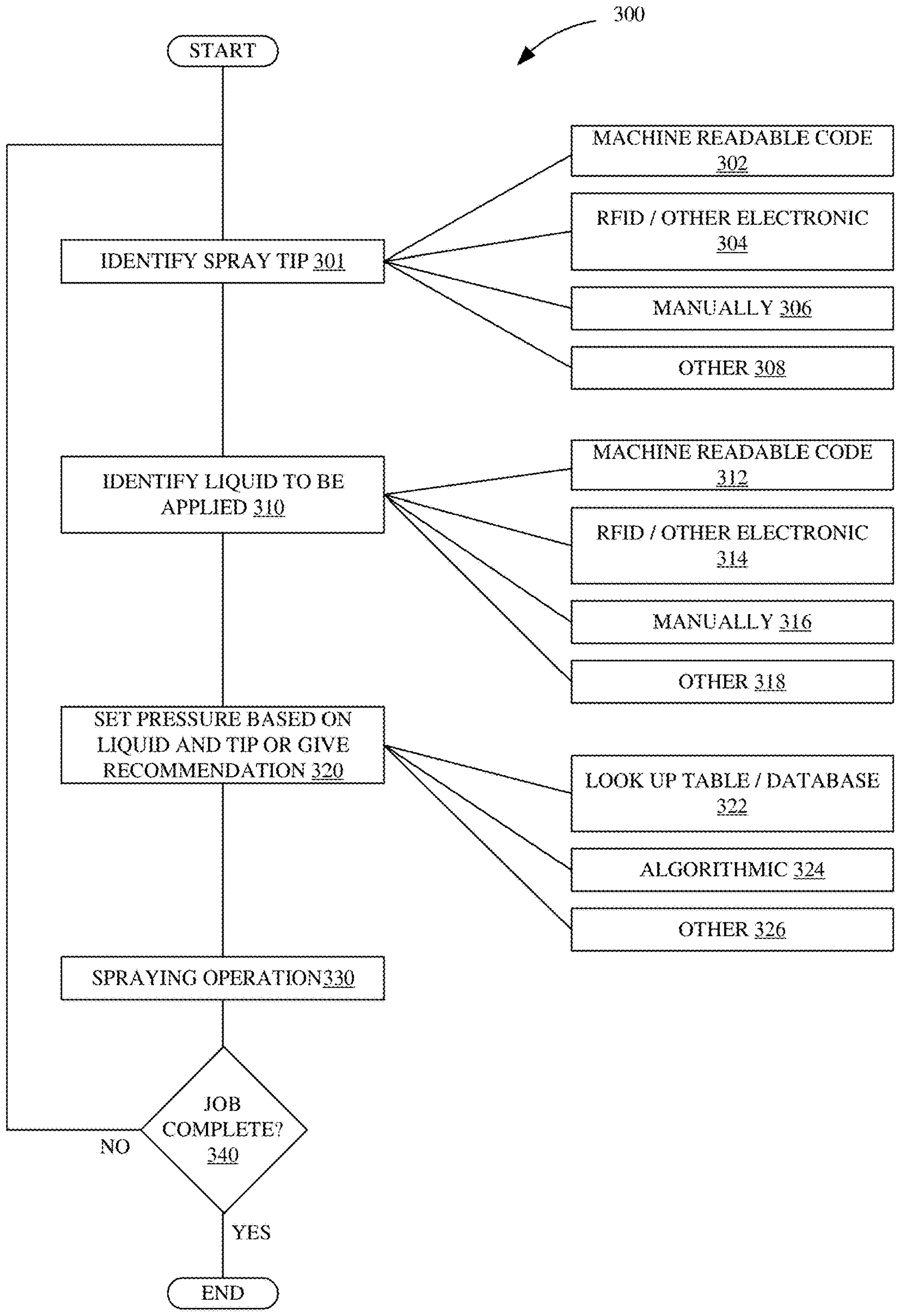
FIG. 7 is a flow diagram showing an example operation of spraying system.

FIG. 7 is a flow diagram showing an example operation of spraying system 100. Operation 300 begins at block 301, where the spray tip is identified (e.g., tip 116 is identified by tip identifying logic 602). Tip 116 can be identified in a variety of different ways, as indicated by blocks 302-308. The spray tip can be identified by scanning a machine-readable code (e.g., a bar or QR code), as indicated by block 302. The bar or QR code can be located on the tip itself, the tip packaging, a tip storage area, etc. The tip can be identified through an RFID, image recognition or other electronic communication, as indicated by block 304. For example, an RFID tag can be embedded in the flag of the spray tip and, when it comes into close proximity of an RFID reader on the applicator 110 or pump 102, the identifying information is read from the RFID tag to identify the tip. The tip can be identified manually, as indicated by block 306. For example, a user selects the tip from a list of tips on an interface (e.g., interface 200). The tip can be identified in other ways as well, as indicated by block 308. For example, an image of the tip can be taken and is analyzed by tip identifying logic 602 to identify the tip.

Operation 300 proceeds at block 310, where the fluid to be applied is identified (e.g., fluid source 124 is identified by fluid identifying logic 604). Fluid can be identified a number of different ways, as indicated by blocks 312-318. Fluid can be identified by scanning a machine-readable code (e.g., a bar or QR code) as indicated by block 312. The machine-readable code can be located on the fluid storage area, the fluid packaging, etc. The reader can be located on a mobile device, the fluid applicator (e.g., applicator 110) or some other device as well.

The fluid to be applied can be identified by an RFID or other electronic method, as indicated by block 314. For example, an RFID tag can be disposed on a bucket in which the fluid is sold in and an RFID reader is located on a fluid intake of the pump to read the RFID tag. The liquid can be identified manually, as indicated by block 316. For example, a user selects the type of fluid from a list on an interface 200. The liquid can be identified in other ways as well, as indicated by block 318. For examples, an image of the fluid source can be taken and is analyzed by fluid identifying logic 604 to identify the fluid source.

Operation 300 proceeds at block 320, where the pressure is set or a recommendation is made, based on the identified fluid and tip (e.g., by recommendation logic 618). The pressure can be retrieved from a lookup table or database of fluids and tips, as indicated by block 322. The pressure can be set based on an algorithm, as indicated by block 324. The pressure can be set based on other items as well, as indicated by block 326. In some examples, a different setting other than pressure is modified.

In addition, or in the alternate, a recommendation may be given to the user. In some examples, the user may be informed of an incompatibility between the fluid and the tip. In some examples, a recommendation may be made to the user to use a different tip/fluid combination for a better spray pattern. In one example, the user selects a desired type of atomization rate or pattern and the system recommends a specific tip/fluid/pump setting combination to achieve the desired outcome.

Operation 300 proceeds at block 330 where the fluid is pumped from the pump 102 to the applicator, where it is sprayed at the pressure determined in block 320. In one example, the pressure or setting is changed automatically (e.g., by control logic 620). In another example, the pressure or setting change is recommended to the user (e.g., by recommendation logic 618 and displayed on a display of the pump, mobile device, etc.). In another example, the pressure or setting change is made automatically, unless the user vetoes the change.

During operation the system 600 can provide other functions as well. For example, the tip life is displayed intermittently during the spray operation to the operator. In another example, as the tip life degrades the pump is adjusted to maintain a consistent spray pattern. Additionally, the flow rate and/or current application thickness are displayed (e.g., in oz/min).

At block 340 it is determined if the job is complete. If so, then operation 300 ends. If not, then operation 300 proceeds to block 301.

Figure 8A:
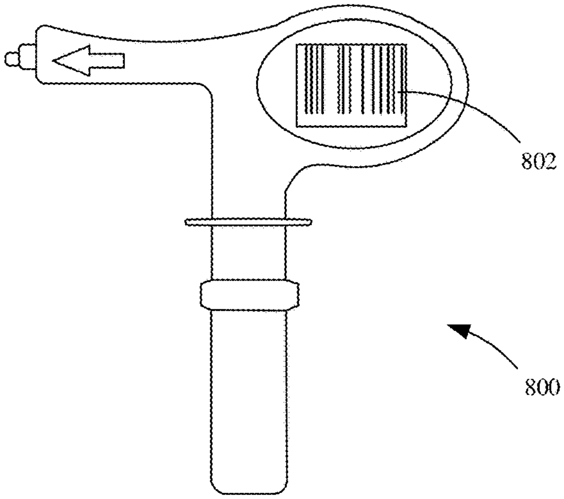
FIGS. 8A-D are side views showing example tips.

FIG. 8A is a side view showing an example spray tip. The tip of FIG. 8A includes a machine-readable code 802 that can be scanned by a device to identify tip 800. As shown, machine readable code 802 is a barcode, however it could be a different type of machine-readable code as well. One example of an identification device that can read barcode 802 is shown in FIG. 9A-9B.

Figure 8C:
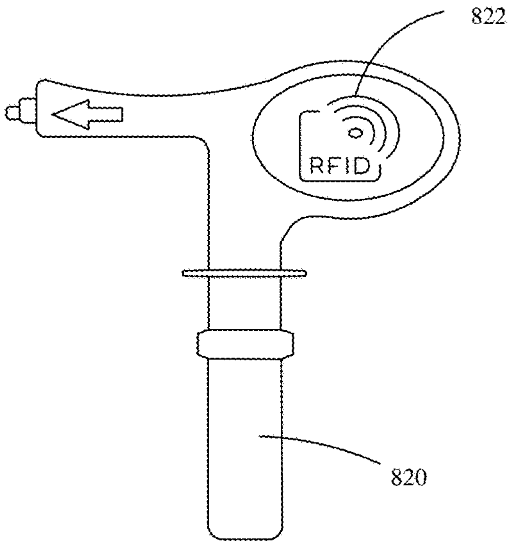
Figure 8B:
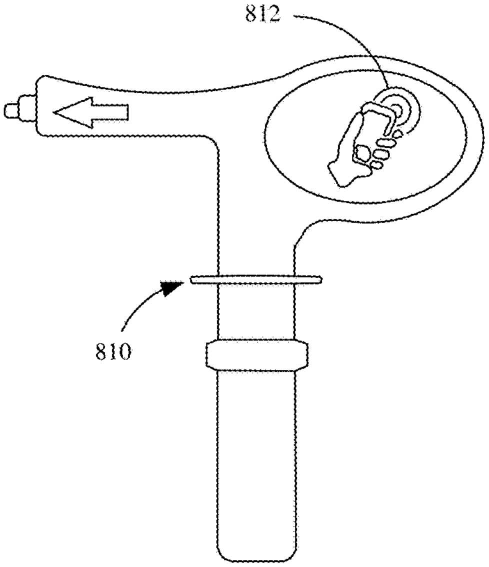
Figure 8D:
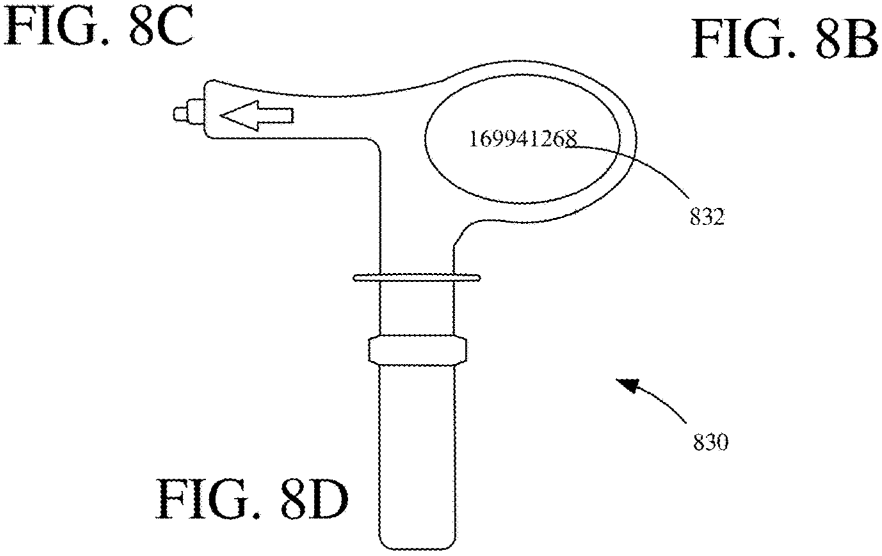

FIG. 8B is a side view showing an example tip. Tip 810 includes a near field communication device 812. Near field communication device 812 can be sensed by a mobile device or other near field communication device to identify tip 810. One example of an identification device that can communicate with near field communication device 812 is shown in FIGS. 9A-9B.

FIG. 8C is a side view showing an example tip 820. Tip 820 has a RFID identifier 822. RFID identifier 822 can be sensed by another device to identify tip 820. One example of an identification device that can communicate with RFID identifier 822 is shown in FIGS. 9A-9B.

Figure 9A:
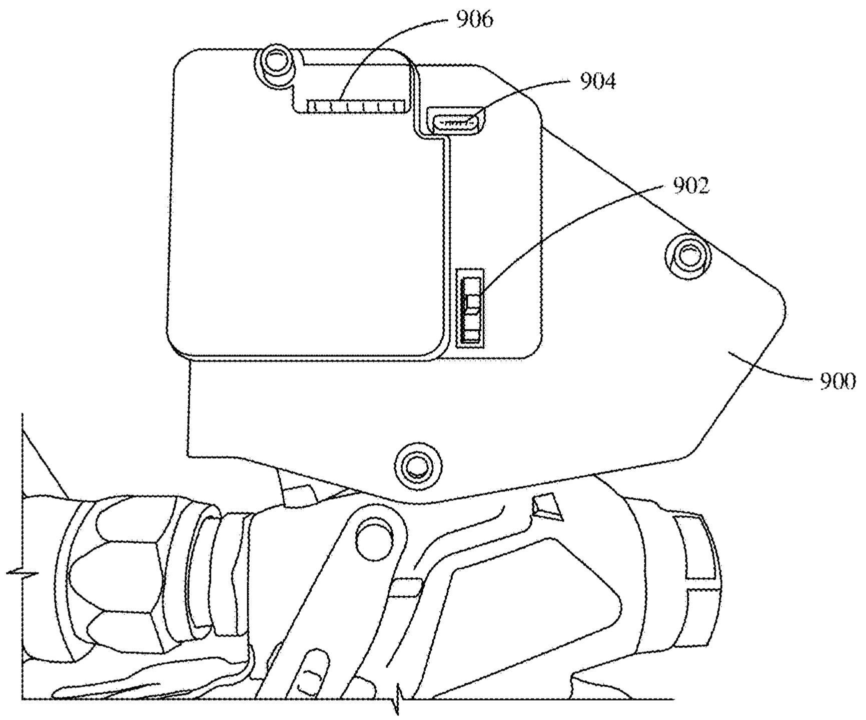
FIGS. 9A-B are side views showing example spraying systems.
Figure 9B:
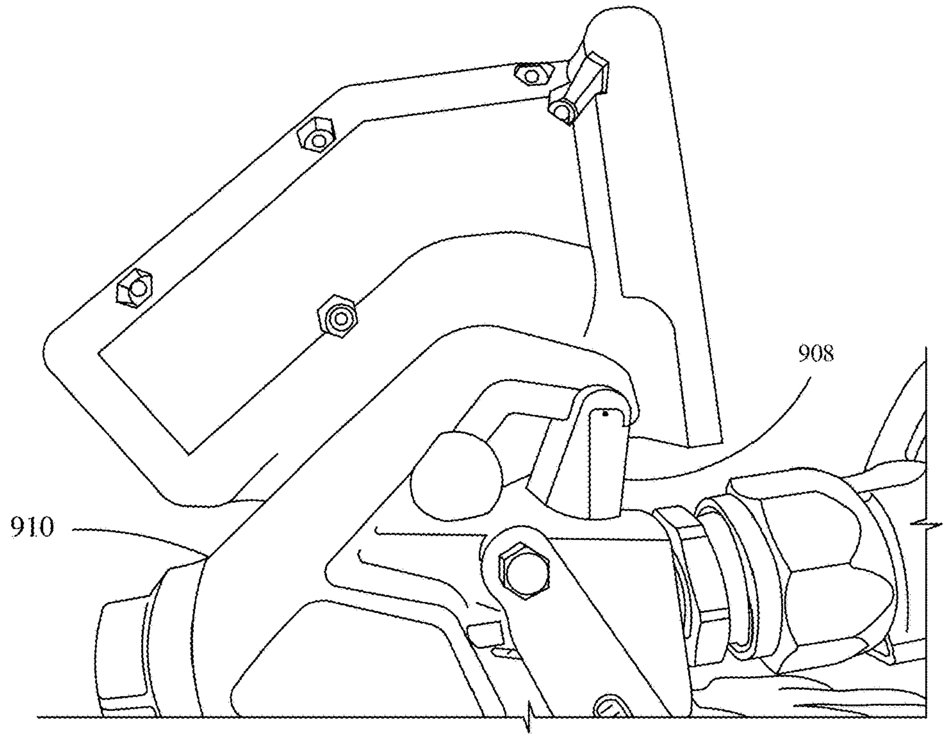

FIG. 9A is a side view of an example identification device 900 that includes a power switch 902, a charger 904, and communication pins 906. Identification device 900 can be any one or more of the devices previously mentioned that identify a tip (e.g., barcode or QR reader, RFID reader, NFC device). Identification device 900 can be powered on or off by switch 902. Identification device 900 can be charged by charging port 904. Identification device 900 can connect to a different device via communication pins 906. In addition, or in the alternate, identification device 900 can wirelessly connect with other components.

FIG. 9B is a side view showing the example identification device 900 of FIG. 9A. As shown, identification device 900 includes coupling device 908 that couples identification device 900 to a fluid applicator 910. As shown, applicator 900 is similar to applicator 110 discussed above. In one example, coupling device 908 requires tools for coupling of identification device 900 to applicator 910. In other examples, coupling device 908 may require no tools to be coupled to applicator 910.

Figure 10A:
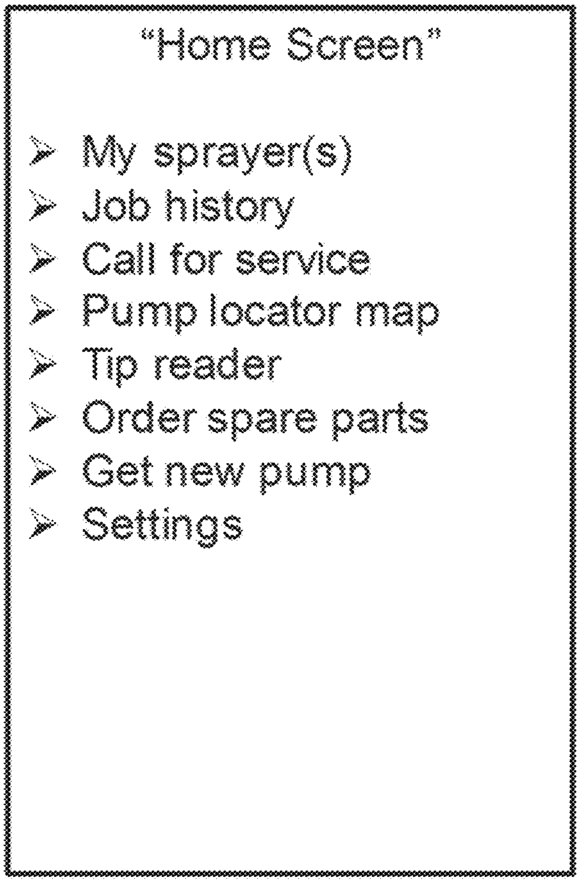
FIGS. 10A-10K are diagrammatic views showing example user interface displays.

FIG. 10A-K illustrate example user interfaces that can be displayed on a device (e.g. such as interface 200). FIG. 10A is an example home screen user interface that shows a variety of options, such as, but not limited to my sprayers, job history, call for service, pump locator map, tip reader, order spare parts, get new pump, and settings. Actuating the "my sprayer" mechanism generates the user interface of 10B.

Figure 10B:
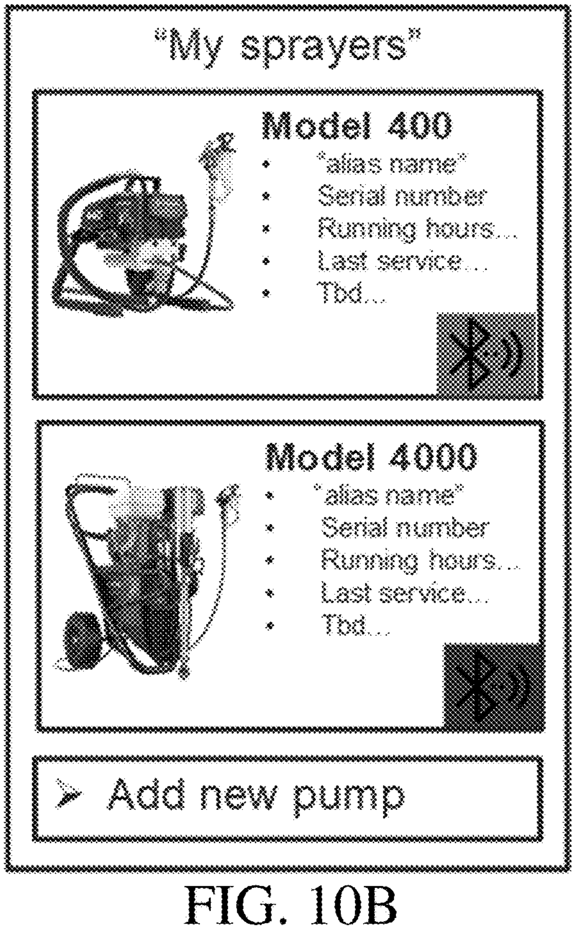

The interface of FIG. 10B shows the sprayers that are currently coupled to the device displaying the interface. For example, as shown, the "model 400 sprayer" is connected to the device (that is displaying the interface) and the model 4000 sprayer is not connected to the device but has been previously connected to or identified by the device. This interface also allows a user to add or remove pumps from the sprayer list for easy connection.

Figure 10C:

FIG. 10C is an example interface that is shown when a user selects a pump in the interface of FIG. 10B. Interface of FIG. 10C allows a user to perform tasks, such as, start a new job, began auto cleaning of selected pump, order spare pumps for the part, locate the pump (e.g., location of pump can be used based on a strength of a wireless signal), set a lock code for the current pump, called a service, and/or show a pump lifetime history. Of course, these are examples only and more options may be available in the sprayer dashboard interface of FIG. 10C.

Figure 10D:
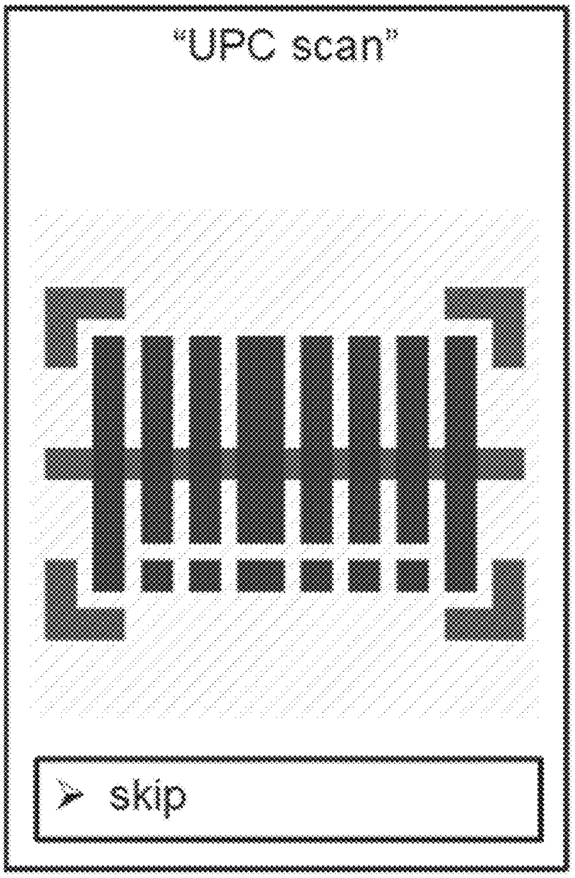

FIG. 10D shows an example scanning interface that accesses a camera of the interface device and allows a user to use their camera to locate a UPC, barcode or other MR code.

Figure 10E:
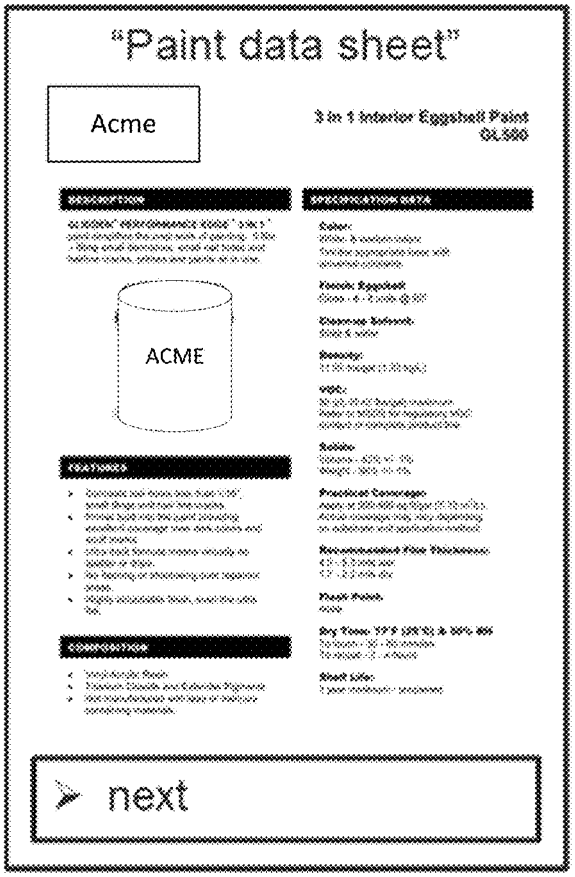

FIG. 10E is an interface showing fluid data. In the example shown, the fluid is a paint and has been selected by scanning a UPC or barcode on the paint can. For instance, the UPC is scanned and used to acquire fluid information from an online database, in some examples, that could be provided from the fluid manufacturer.

Figure 10F:
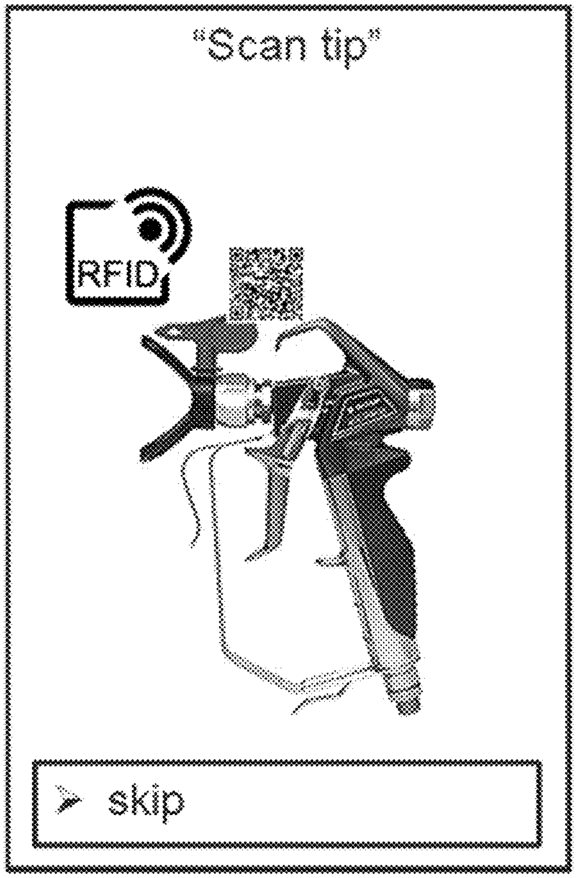

FIG. 10F is similar to FIG. 10D, however, the scanning process is used to identify a tip rather than a fluid. As illustratively shown, the interface of FIG. 10F can allow a user to either scan an MR code (e.g., barcode, QR code, etc.) or can use a wireless connection such as RFID to identify the tip.

Figure 10G:
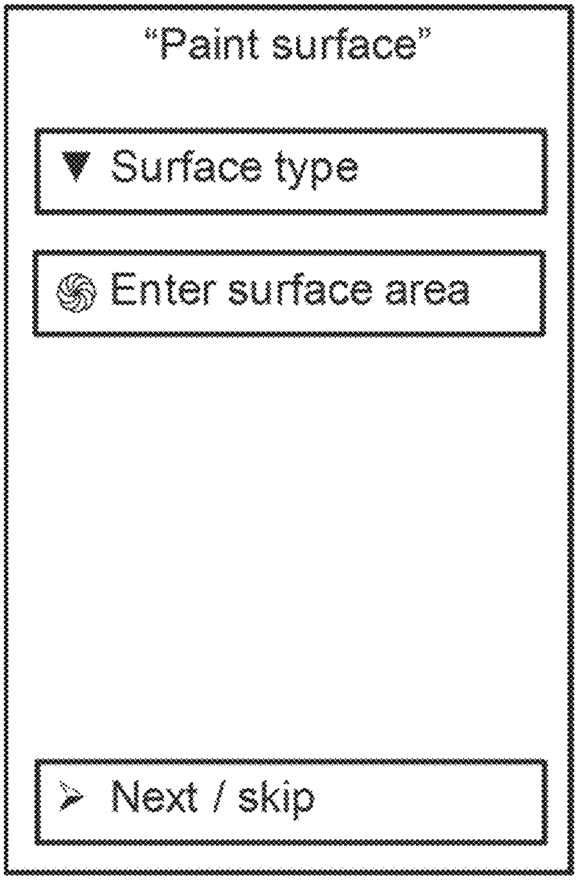

FIG. 10G is an example interface that allows a user to enter characteristics of the surface that they will be painting on. For example, a surface type can be chosen such as porous, flat, etc. The surface type can be important in a painting operation as different surfaces absorb paint at different rates or require more paint for proper coverage. The surface area may also be entered. The surface area can be used to calculate the percent complete of a job while a user is spraying. For instance, using the surface type, surface area, and/or desired thickness it can be determined how much paint will need to be used to cover this area. Then this required amount of paint is compared against the paint and operators using during a spraying operation. For instance, it may be calculated that, for proper coverage, 4.5 gallons of paint may be needed and during operation a user can be notified of how much paint they have remaining versus how much paint is required for proper coverage.

Figure 10H:
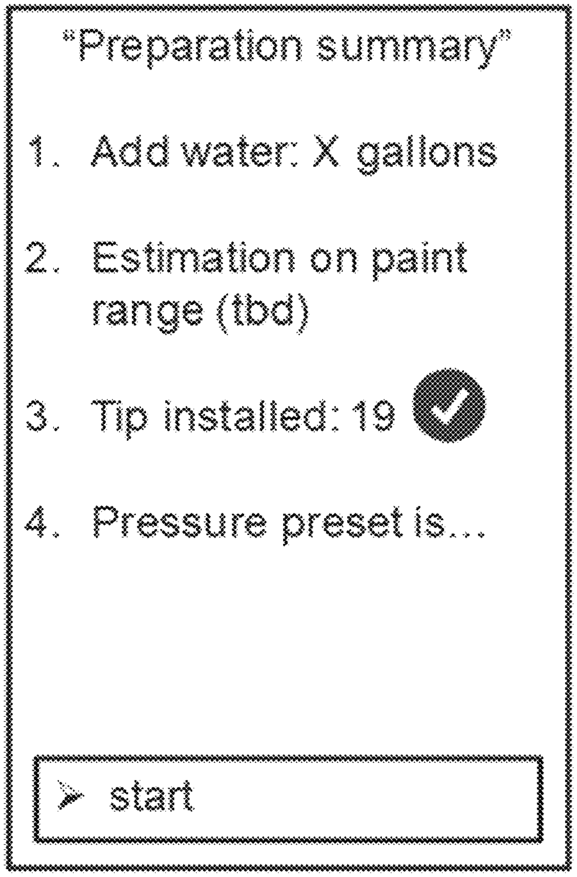

FIG. 10H is example an interface that shows a user a preparation summary. A preparation summary can be gathered via the paint information (e.g. the paint information shown in FIG. 10A) and the tip installed amongst other things, such as pump characteristics and/or tip characteristics.

Figure 10I:
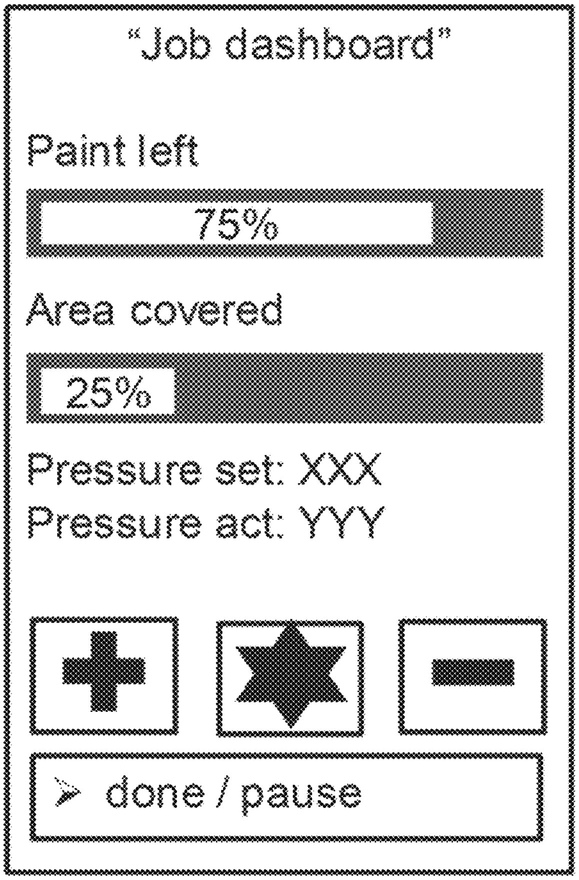

FIG. 10I is an example interface showing a job dashboard. The job dashboard can be displayed while a user is in a spraying operation. Some metrics that can be shown are paint left, area covered, pressure set and pressure acting. Paint left can be calculated via a sensor (e.g., fluid level sensor 121) on the pump. The area covered can be calculated via the previously discussed method of FIG. 10G. For example, an algorithm is used to determine how much paint is needed to paint an area and this is compared against the amount of paint used.

Figure 10J:
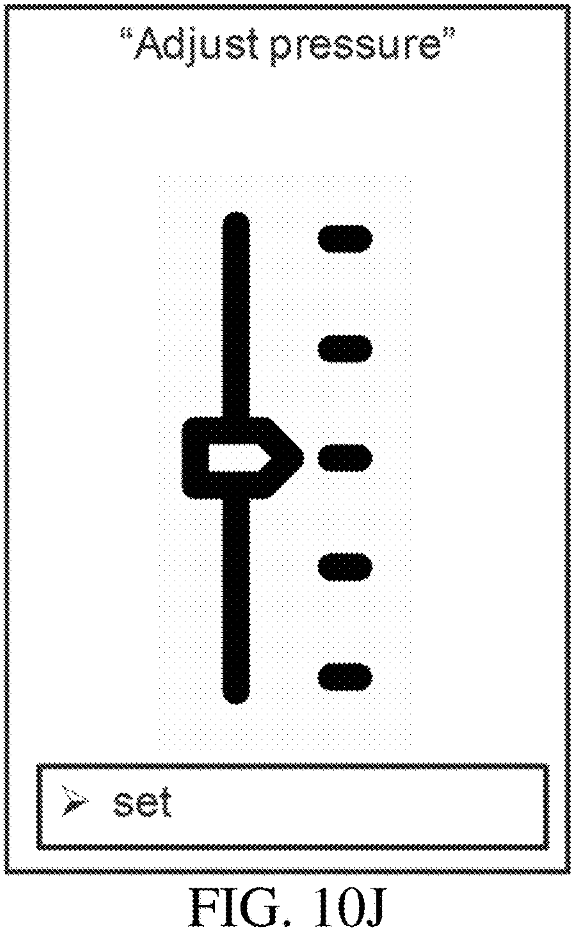

FIG. 10J is an example interface where a user can adjust pressure produced by the pump. As shown, the pressure adjusting mechanism is a slider, however in other examples the pressure adjusting mechanism can be other mechanisms as well. For instance, the pressure can be set with a text input.

Figure 10K:
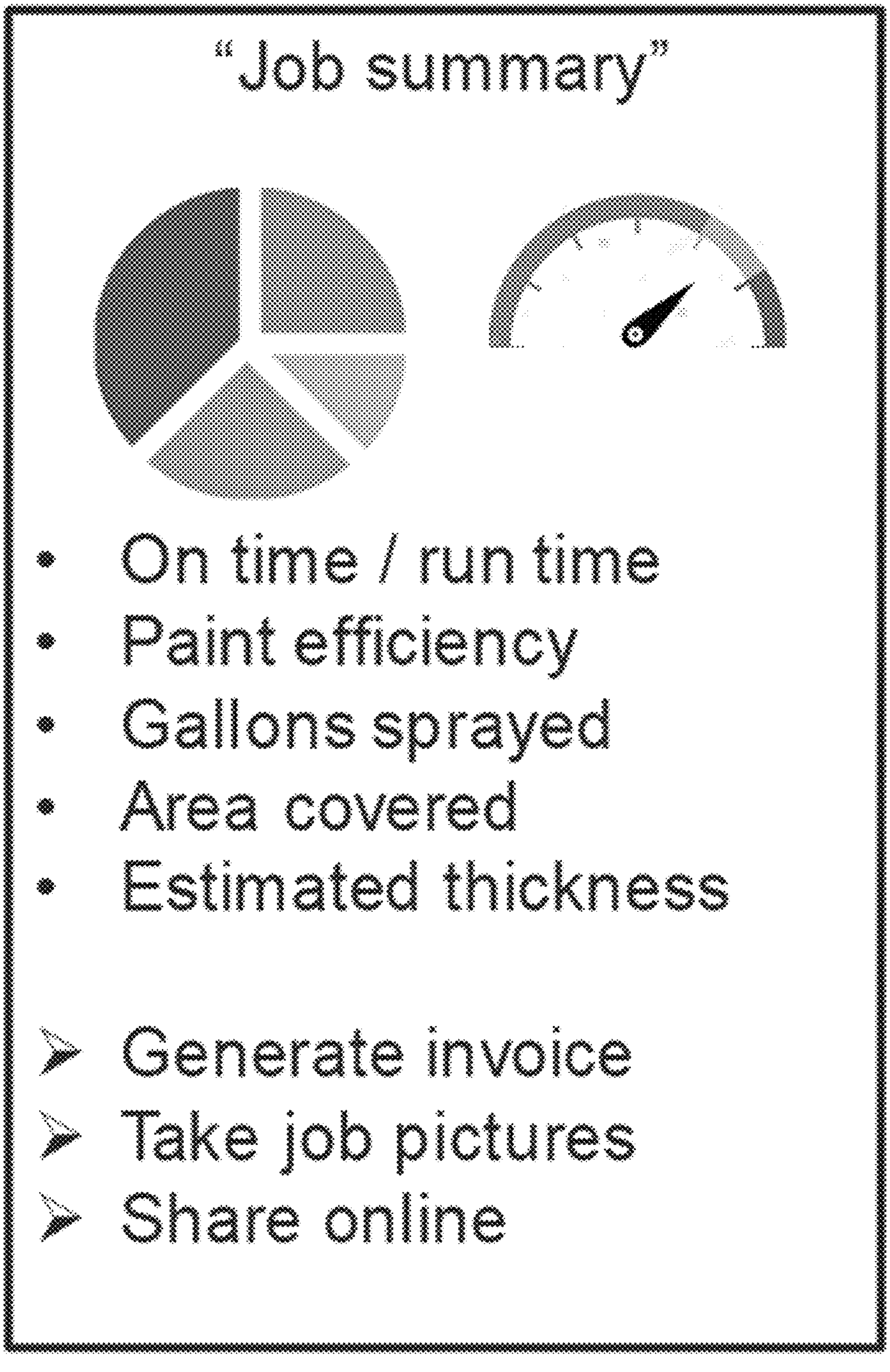

FIG. 10K is an example interface showing a job summary. For example, the job summary can tell a user the time that the pump ran, the painting efficiency, the gallons sprayed, the area covered in (e.g. the area covered can be determined based on accelerometers and gyroscopes within the applicator multiplied by the on time of the applicator), estimated thickness, etc. The job summary interface may also allow a user to generate an invoice based on paint usage, on time, etc. Job summary interface may also allow a user to take job pictures of the job that they have completed. Job summary interface can also have a mechanism that allows the user to share their completed job online (such as social media platforms or business websites).

Figure 11A:
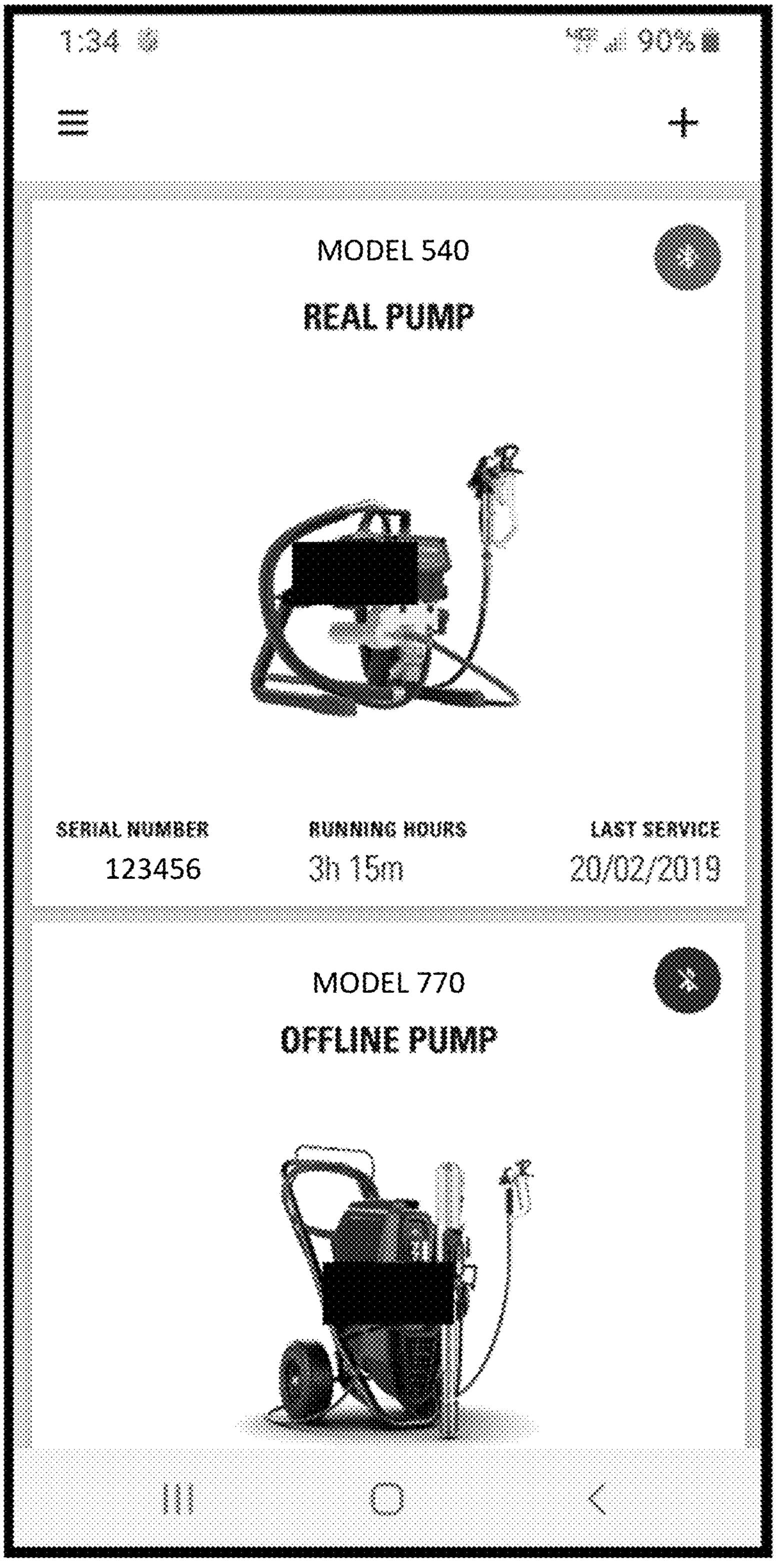
FIGS. 11A-11H are diagrammatic views showing example user interface displays.

FIG. 11A is a diagrammatic view showing an example pump selection interface display. As shown, the interface is displayed on a mobile device and shows two pump selection mechanisms that a user can select from. A user can also scroll further down to see additional pumps. Also, there is a menu button used to alter characteristics of a pump and an 'add' interface mechanisms that allows a user to add another pump to the pump selection interface. As shown, each pump has an indicator of connectivity in the top right, a title in the top center and a sample image of the pump in the center. Additionally, each pump selection mechanism has additional information, such as, a serial number, run time, last service date, etc. In other examples, each selection mechanism can include other items as well (e.g., a pump nickname or other identifier, additional images, etc.).

Figure 11B:
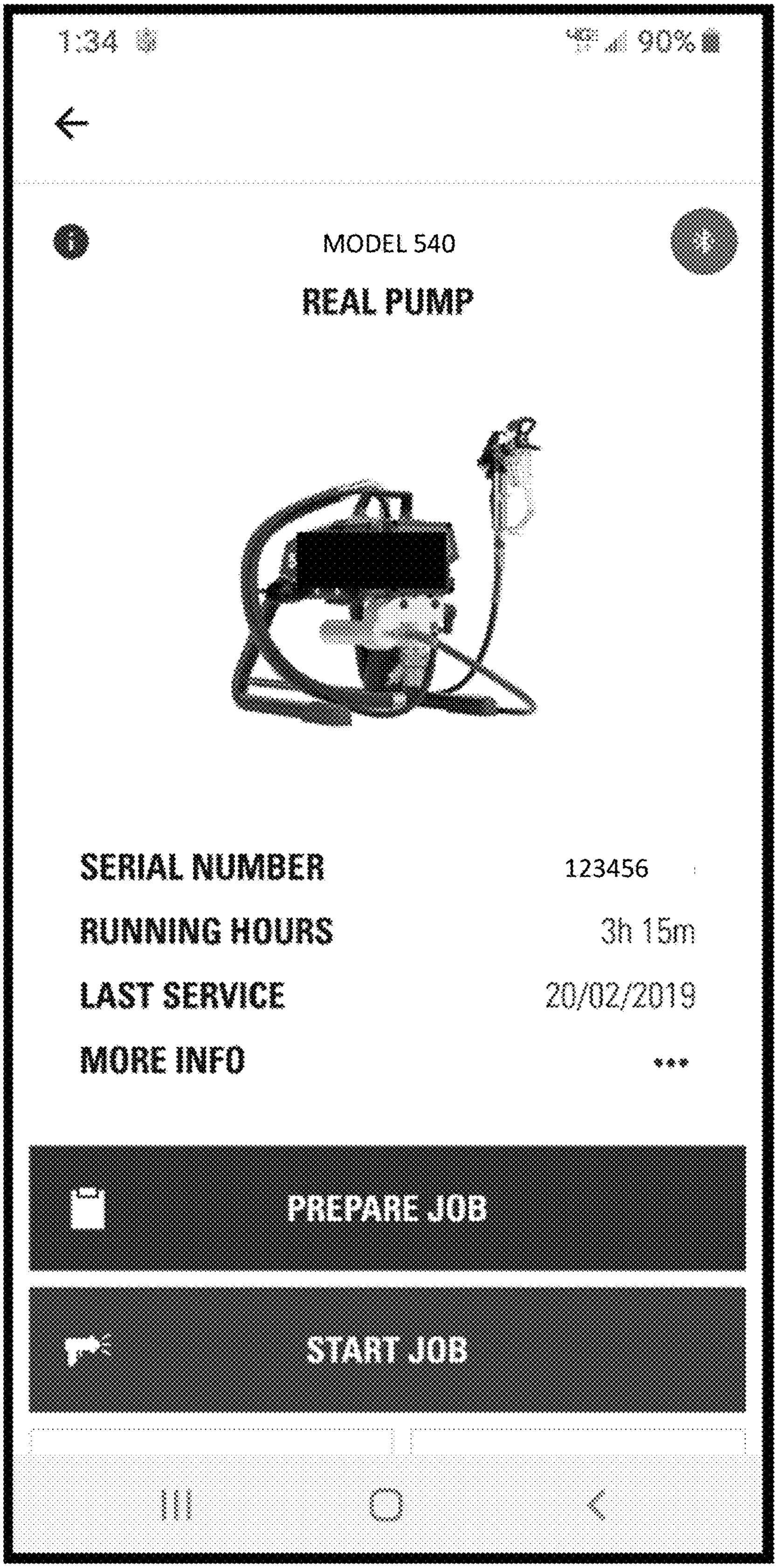

FIG. 11B is a diagrammatic view showing an example pump information interface display. As shown, the interface is on a mobile device, however the interface may be displayed on other devices as well. The interface shows information such as the title/model of the pump and status of connectivity at the top. Additionally, a photo of the pump is provided. At the bottom are the serial number, running hours, last service date, and an option to show more information about the pump. In other examples, this interface could show additional information such as, running hours using specific types of fluid, users that have used the pump, jobs the pump has been used on, etc.

Figure 11C:
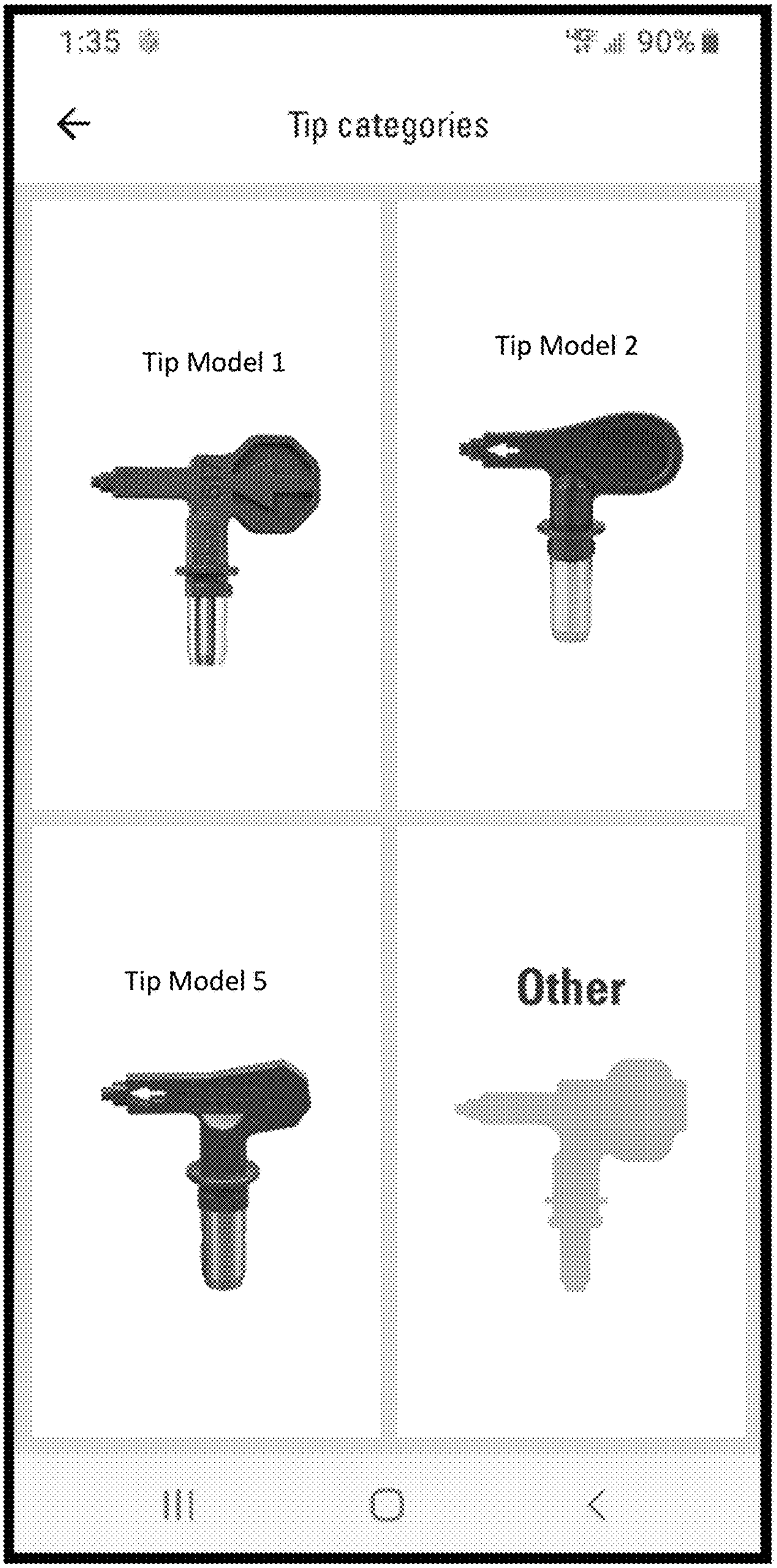

At the bottom of the pump information window are prepare job and start job mechanisms which can be actuated to fulfill different functions. For example, actuating the prepare job mechanism can inform a user what they need to do to prepare for the next job (e.g., service the pump, change a filter or other component. etc.). Actuating the start job mechanism can bring a user to an interface such as the one shown in FIG. 11C. The interface of FIG. 11C allows the user to choose the type of tip that they will be using during the spraying operation. As shown, there are three specific tips selection mechanisms and one 'other tip' selection mechanism. Actuating one of these mechanisms will bring up further information on the tip and/or designate the tip as the tip to be used during the spray operation. In one example, this interface is not presented and instead the tip is automatically detected by the spray system. In another example, actuating one of the tip selection interface mechanisms brings a user to the interface of FIG. 11D.

Figure 11D:

FIG. 11D is a diagrammatic view showing an example tip information interface display. As shown, the interface is displayed on a mobile device. As shown, an image of the tip is provided, and a life of the tip is presented at the top. This life can be calculated by the system, as it saves usage history of the tip. In some examples, a calculation is used to determine tip life. For example, a relationship between a pump RPM and pressure can estimate the size of the tip orifice and the size of the tip orifice has a relationship to the known manufactured orifice size of the tip. For instance, a model 517 tip has a manufactured orifice diameter of 0.017 inches and after 50% use the diameter size may be 0.019 inches. Therefore, if the system detects a 0.019-inch orifice on a model 517 tip the life can be adjusted to 50%.

The interface of FIG. 11D also allows user to change tips or proceed with the currently selected tip, as shown, by the buttons on the bottom of interface of FIG. 11D. The interface of FIG. 11D may also include other tip identifying information such as a nickname, the last user to use the tip. the recommended types of fluid that this tip is used for, the job history this tip has been used on, etc.

Figure 11E:
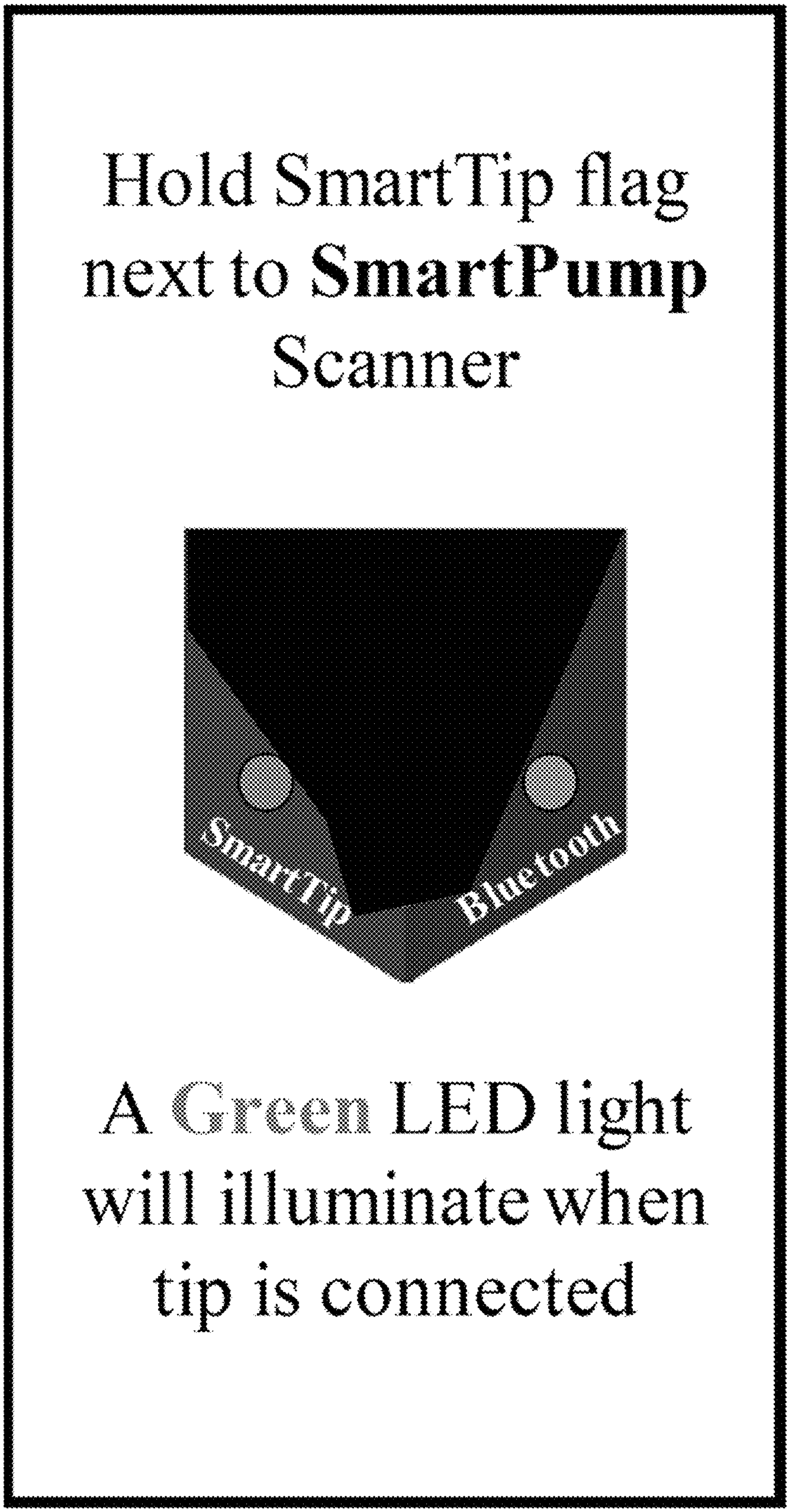

FIG. 11E is a diagrammatic view showing an example tip sensing interface display. As shown, the interface instructs a user to hold a smart tip next to the pump which can be read by a sensor on the pump. For instance, the spray tip may have an embedded RFID, NFC or other wireless communication device that the smart pump scanner can sense. In some examples, the smart tip has a barcode or number, QR code or other machine-readable identifier that the smart pump scanner can read. The pump can have an indicator (e.g., one or more lights, a display, audible device, etc.) that alerts the use the tip has been identified and also when the tip data is sent to the mobile device (e.g., the device that interface eleven a is displayed on). In other examples, the tip may be recognized in other ways as well.

Figure 11F:
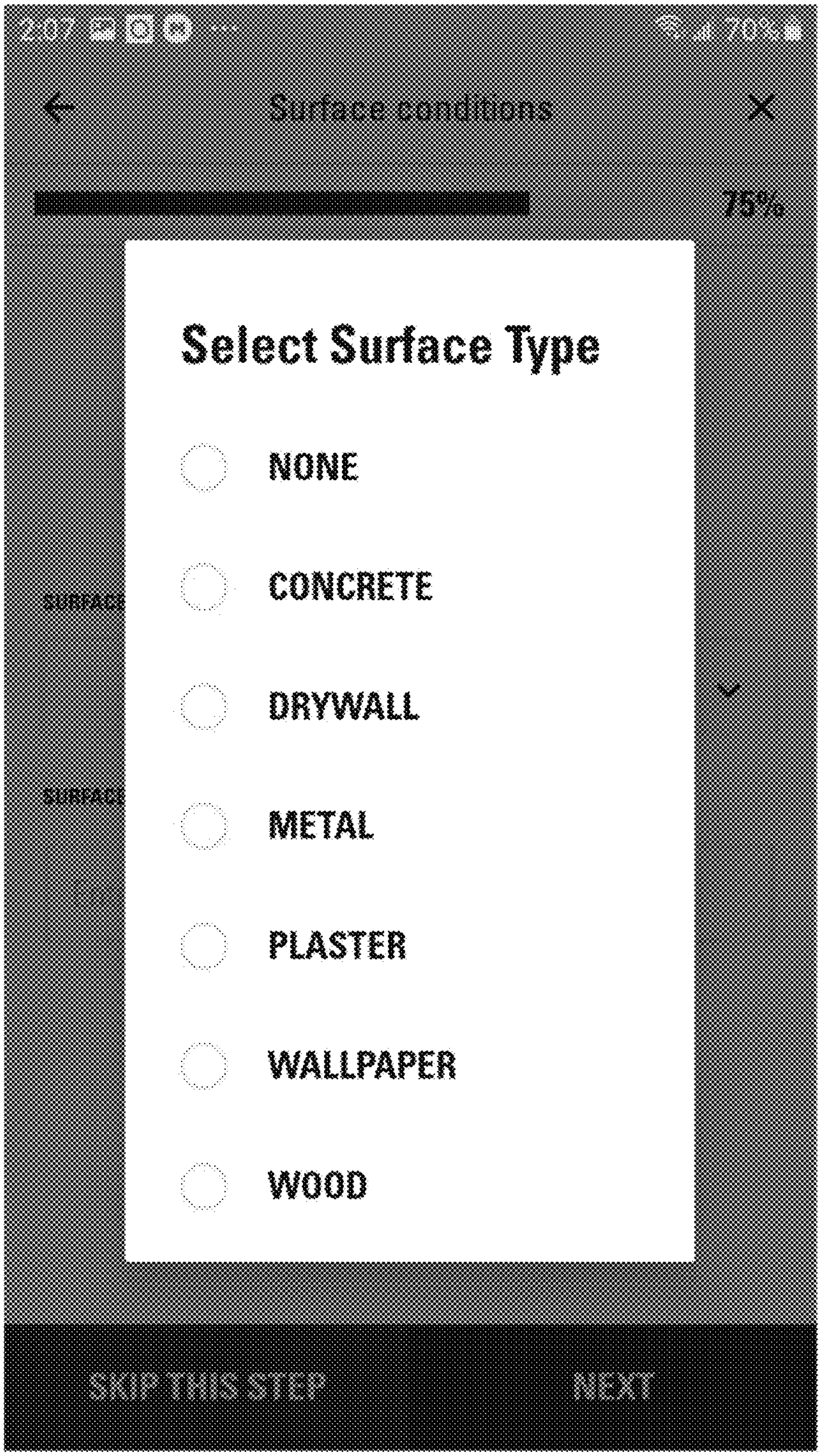

FIG. 11F is a diagrammatic view showing an example surface selection interface display. As shown, there are several different surface types that the user can select from, identified by their industry standard names. In other examples, the user could select the surface type based on its given characteristics (e.g., porosity, absorption, flatness, etc.).

Figure 11G:
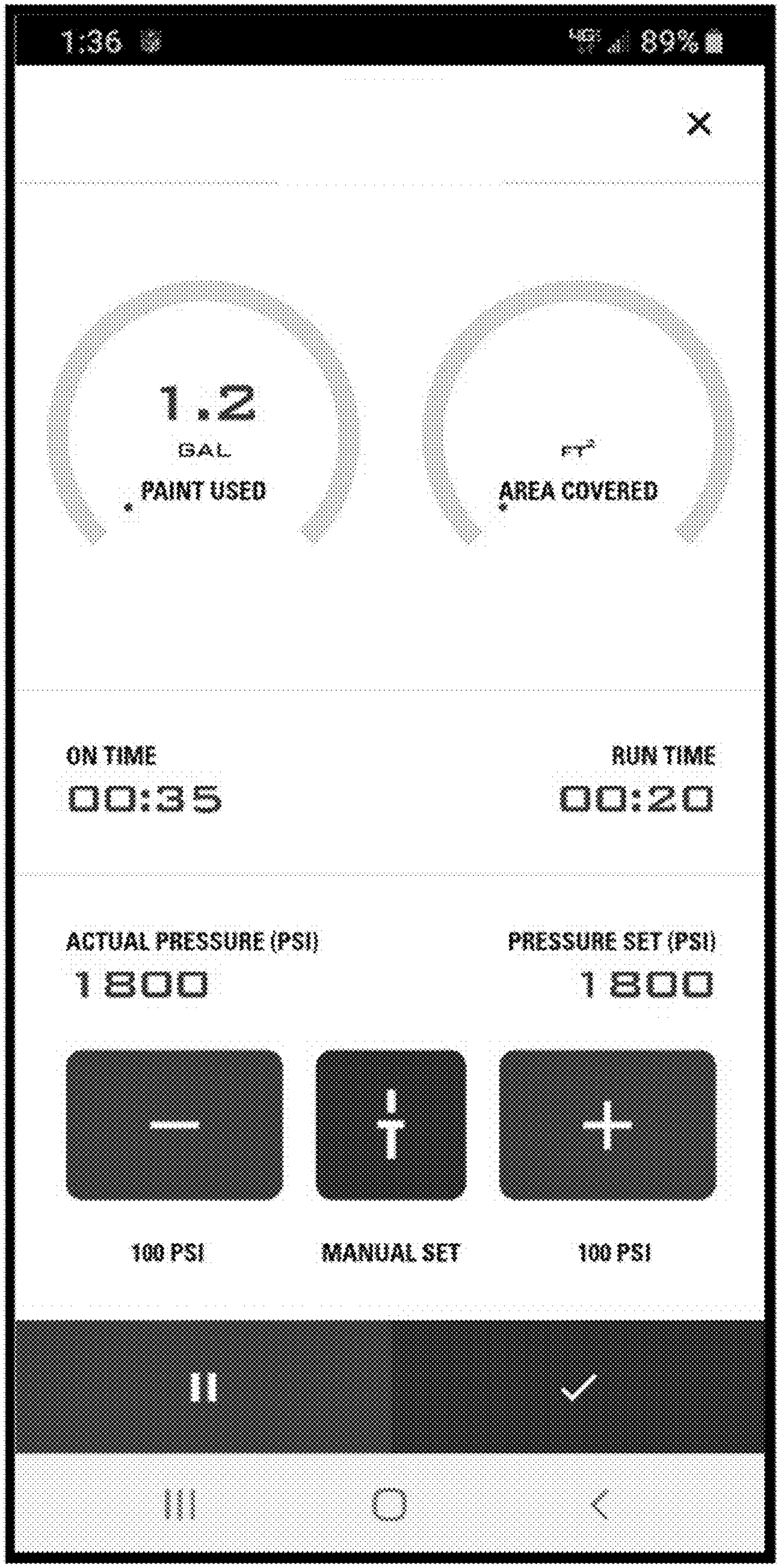

FIG. 11G is a diagrammatic view showing an example operating interface display. As shown, the current amount of paint used, and the area covered is displayed. The paint use can be calculated based on the fluid throughput sensed through the pump (e.g. by calculating the pressure, orifice size, pump RPM. pump displacement, etc.) The area covered can be calculated based on the paint use and a motion sensor (e.g., IMU inertial measurement unit, gyroscope, accelerometers, camera, etc.) in the applicator. In some examples, the area covered can be calculated with a visual sensor (e.g., on the paint sprayer or elsewhere).

The interface of FIG. 11G also displays the on-time, that is, the time that the system or pump has been powered on. The interface of FIG. 11G also shows the runtime, that is, the time that the pump has been running to pump paint. The interface of FIG. 11G also allows a user to change the pressure of the smart pump. As shown, there are interval mechanisms allow a user to increase the pressure in intervals of 100 psi. In other examples, this could be changed to a different interval value as well (e.g., 50 psi, 250 psi, 1 bar, etc.). In one example, a user can actuate the manual set mechanism which can generate an interface similar to that shown in FIG. 11H. Additionally, the pressure set is displayed, and the actual pressure is also displayed. In some examples, these pressures may be different which can indicate an error with the pump or other component.

Figure 11H:
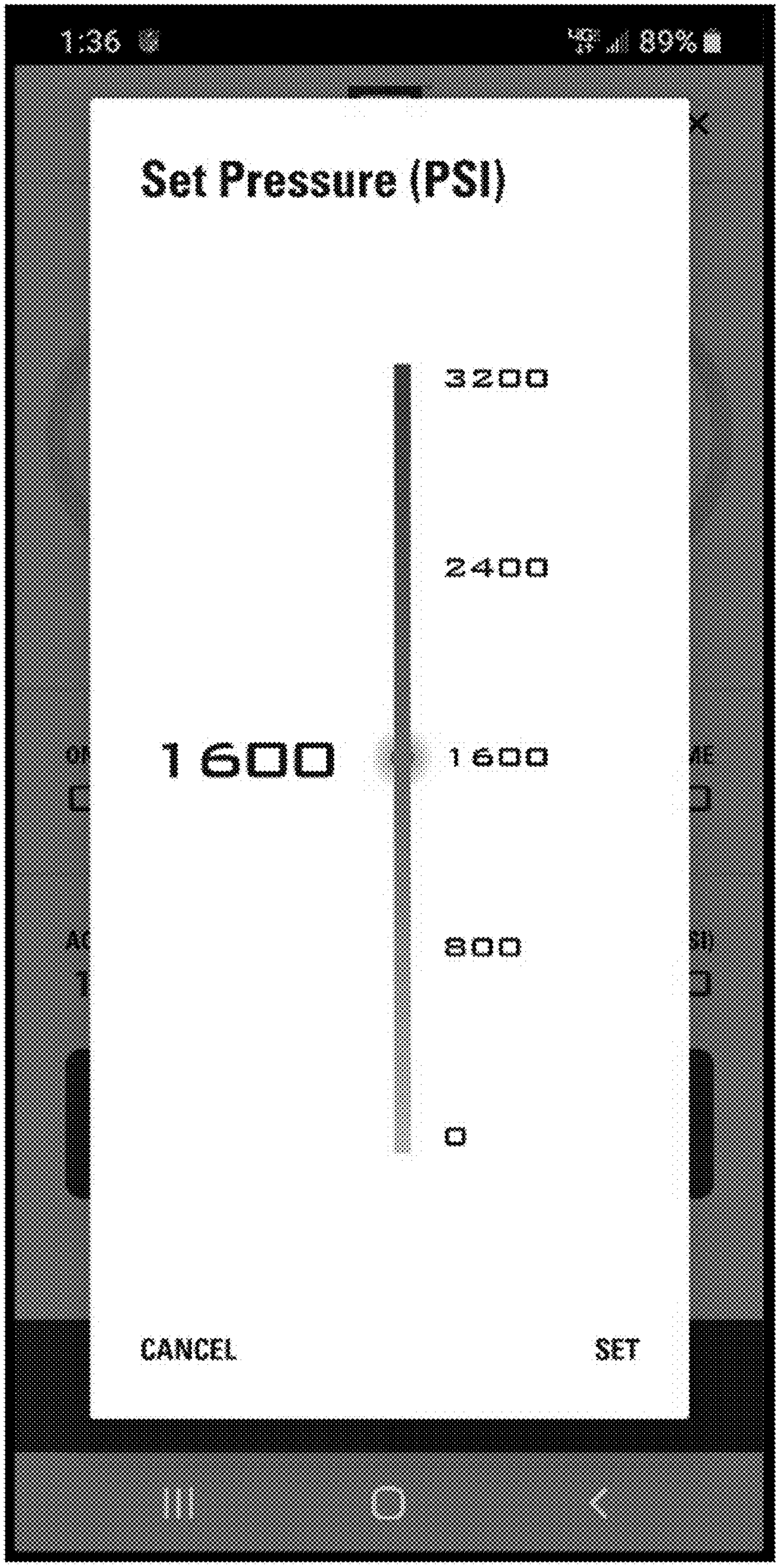

FIG. 11H is a diagrammatic view showing an example pressure setting interface display. As shown, the pressure can be set by actuating an interface mechanism along a scale. The scale can correspond to the limits of the smart pump that the device is attached coupled to connected to. For instance, the max setting is shown to be three-thousand-two-hundred psi and the minimum is zero psi while the user has selected one-thousand-six-hundred psi as the operating pressure. In some examples, the scale corresponds to commonly used pressures (e.g. based on the fluid being applied, type of job, etc.) In other examples, the pressure can be set manually in other ways, such as typing in a value.

At least some examples are described herein in the context of applying a coating material, such as paint, to a surface. As used herein, paint includes substances composed of coloring matter or pigment suspending in a liquid medium as well as substances that are free of coloring matter or pigment. Paint can also include preparatory coatings, such as primers. Paint can be applied to coat a surface as a liquid or a gaseous suspension, for example, and the coating provided can be opaque, transparent, or semi-transparent. Some particular examples include, but are not limited to, latex paint, oil-based paint, stain, lacquers, varnish, inks, and the like. At least some examples can be applied in plural components systems. For example, multiple identification devices identify the plurality of components used in the plural component system.

It should also be noted that the different examples described herein can be combined in different ways. That is, parts of one or more examples can be combined with parts of one or more other examples. All of this is contemplated herein.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 12:
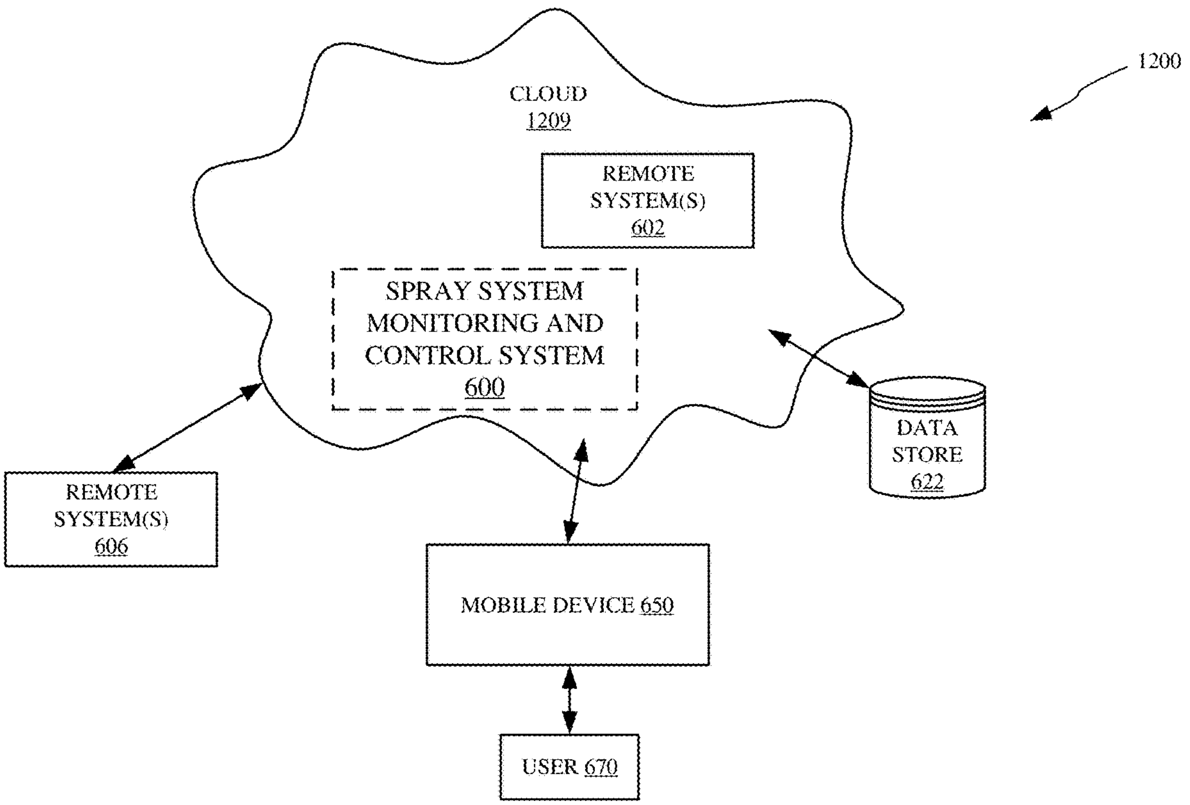
FIG. 12 shows one example of the architecture illustrated in FIG. 6, deployed in a remote server environment.

FIG. 12 is a block diagram of spraying system environment 99, shown in FIG. 6, deployed in a remote server architecture 1200. In an example, remote server architecture 1200 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 6 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 12, some items are similar to those shown in FIG. 6 and they are similarly numbered. FIG. 6 specifically shows that spray system monitoring and control system 600 can be located at a remote server location 1209. Alternatively, or in addition, one or more of remote systems 611 and/or data stores 622 can be located at the remote server location 702. Therefore, mobile device 650, user 670, spraying system 100, and other components access those systems through remote server location 1209.

FIG. 12 also depicts another example of a remote server architecture. FIG. 12 shows that it is also contemplated that some elements of FIG. 6 are disposed at remote server location 702 while others are not. By way of example, spray system monitoring and control system 600 can be disposed at a location separate from location 702 and accessed through the remote server at location 702. Further, one or more of data stores 622 can be disposed at a location separate from location 1209 and accessed through the remote server at location 1209. Regardless of where they are located, they can be accessed directly by spraying system 100, through a network (either a wide area network or a local area network), they can be hosted at a remote site by a service, or they can be provided as a service, or accessed by a connection service that resides in a remote location.

It will also be noted that the elements of FIG. 6, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 13:
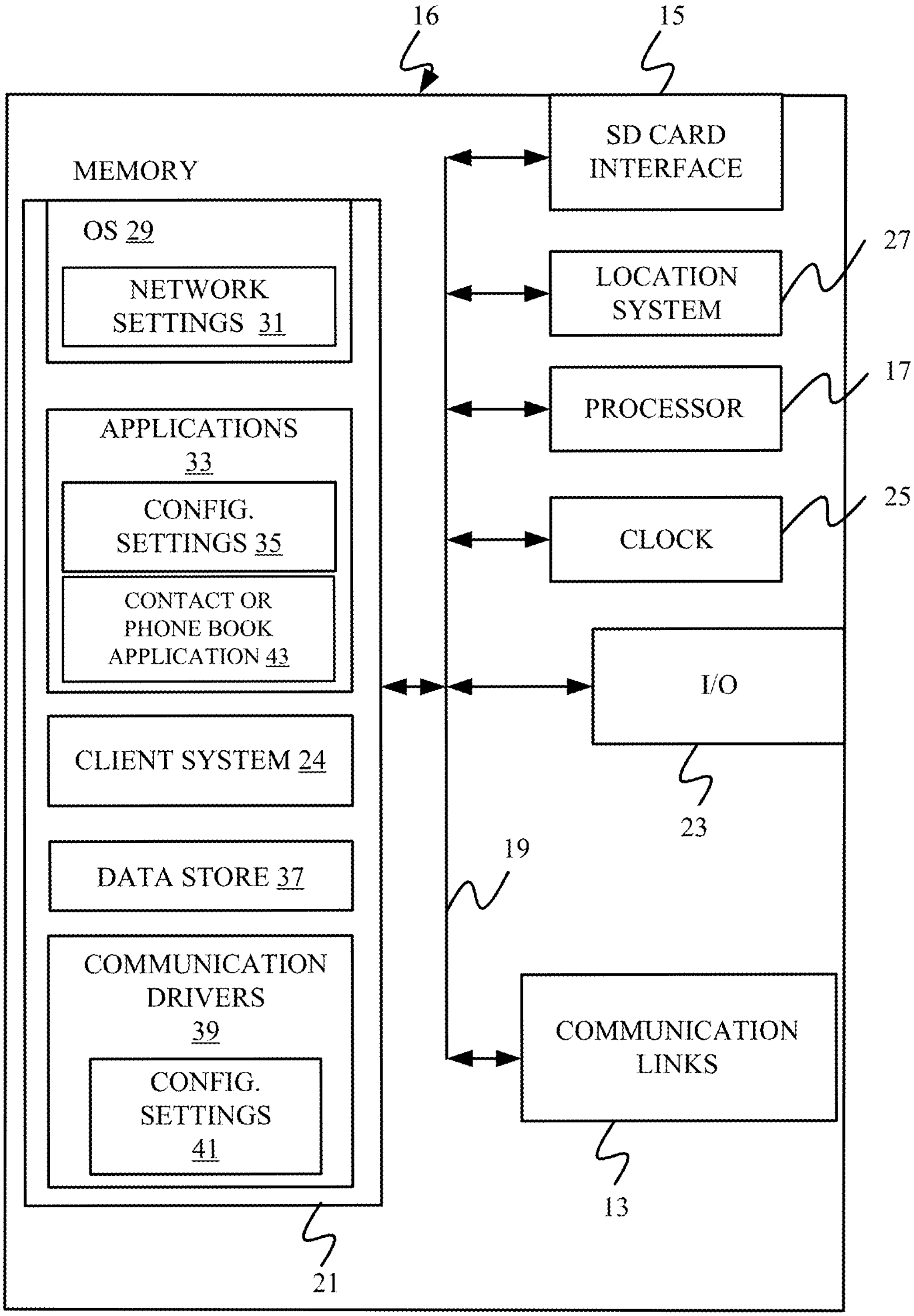
FIGS. 13-15 show examples of mobile devices that can be used as operator interface mechanisms in the architectures shown in the previous Figures.
Figure 14:
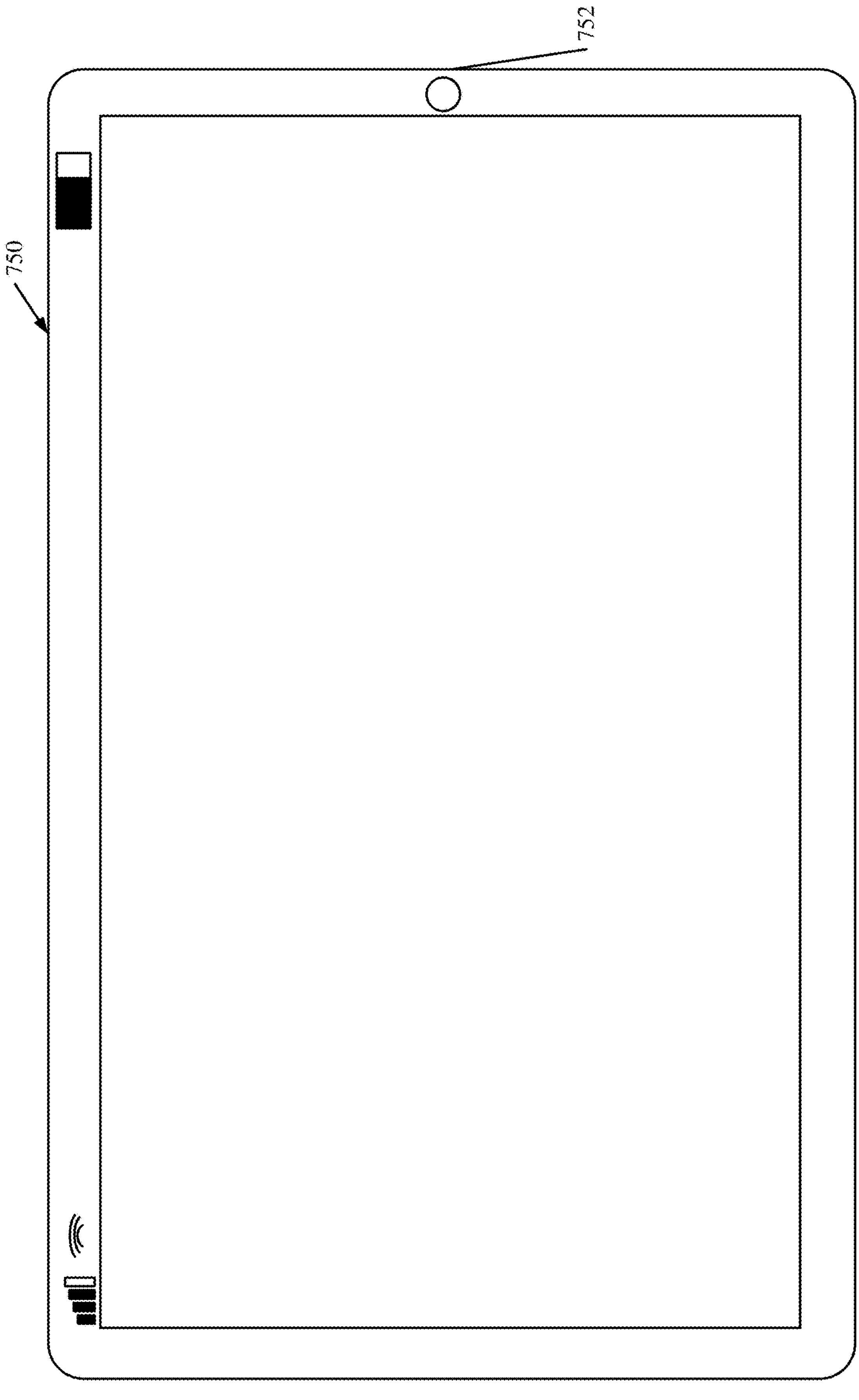
Figure 15:
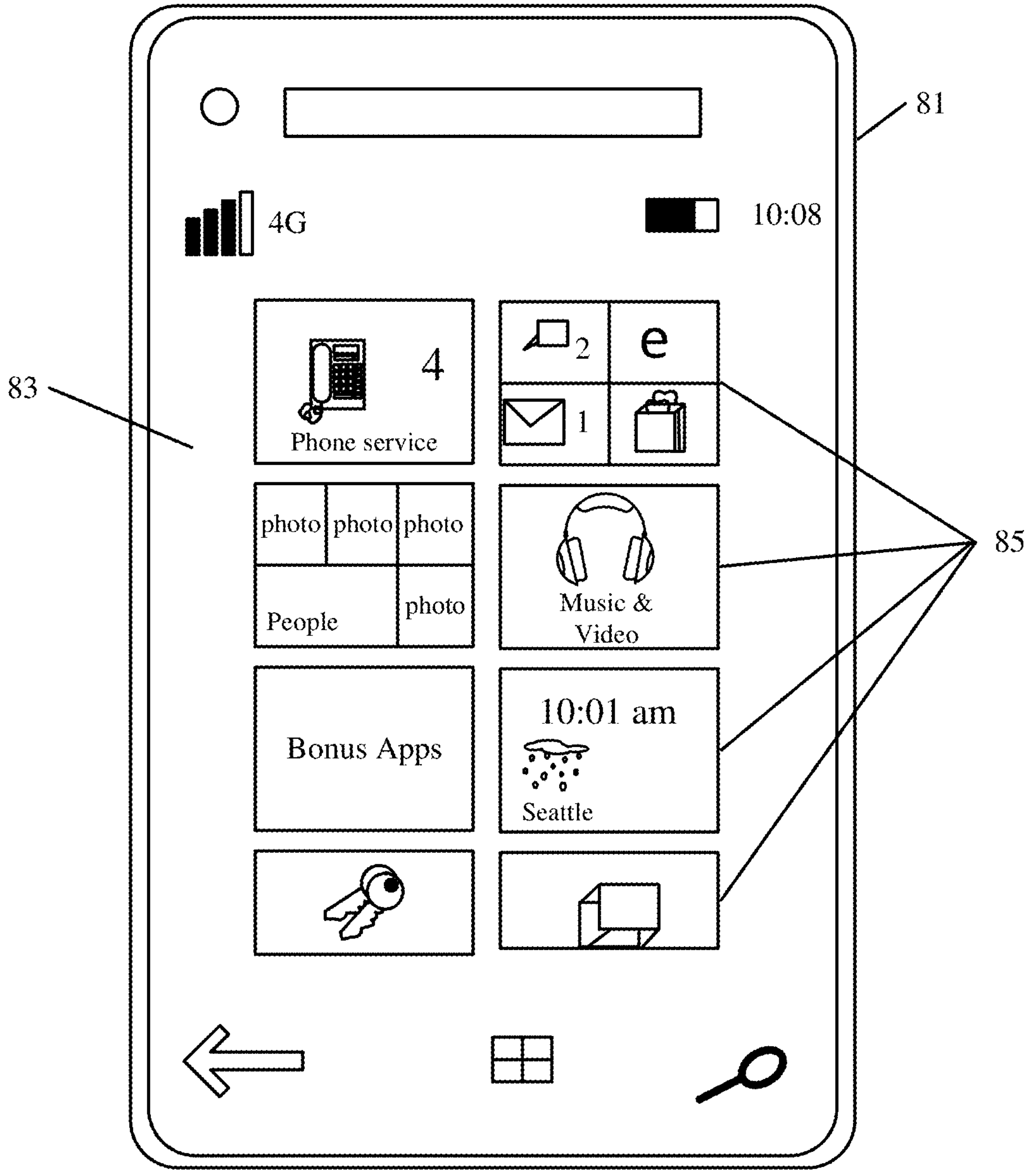

FIG. 13 is a simplified block diagram of one illustrative example of a handheld or mobile computing device that can be used as a user's or client's device 16, in which the present system (or parts of it) can be deployed. FIGS. 14-15 are examples of handheld or mobile devices.

FIG. 13 provides a general block diagram of the components of a device 16 that can run some components shown in FIG. 6, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communications link 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other types of I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 14 shows one example in which device 16 is a tablet computer 750. In FIG. 14, computer 750 is shown with user interface display screen 752. Screen 752 can be a touch screen or a pen-enabled interface that receives inputs from a pen or stylus. It can also use an on-screen virtual keyboard.

Of course, it might also be attached to a keyboard or other user input device through a suitable attachment mechanism, such as a wireless link or USB port, for instance. Computer 750 can also illustratively receive voice inputs as well.

FIG. 15 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. Note that other forms of device 16 are possible.

Figure 16:
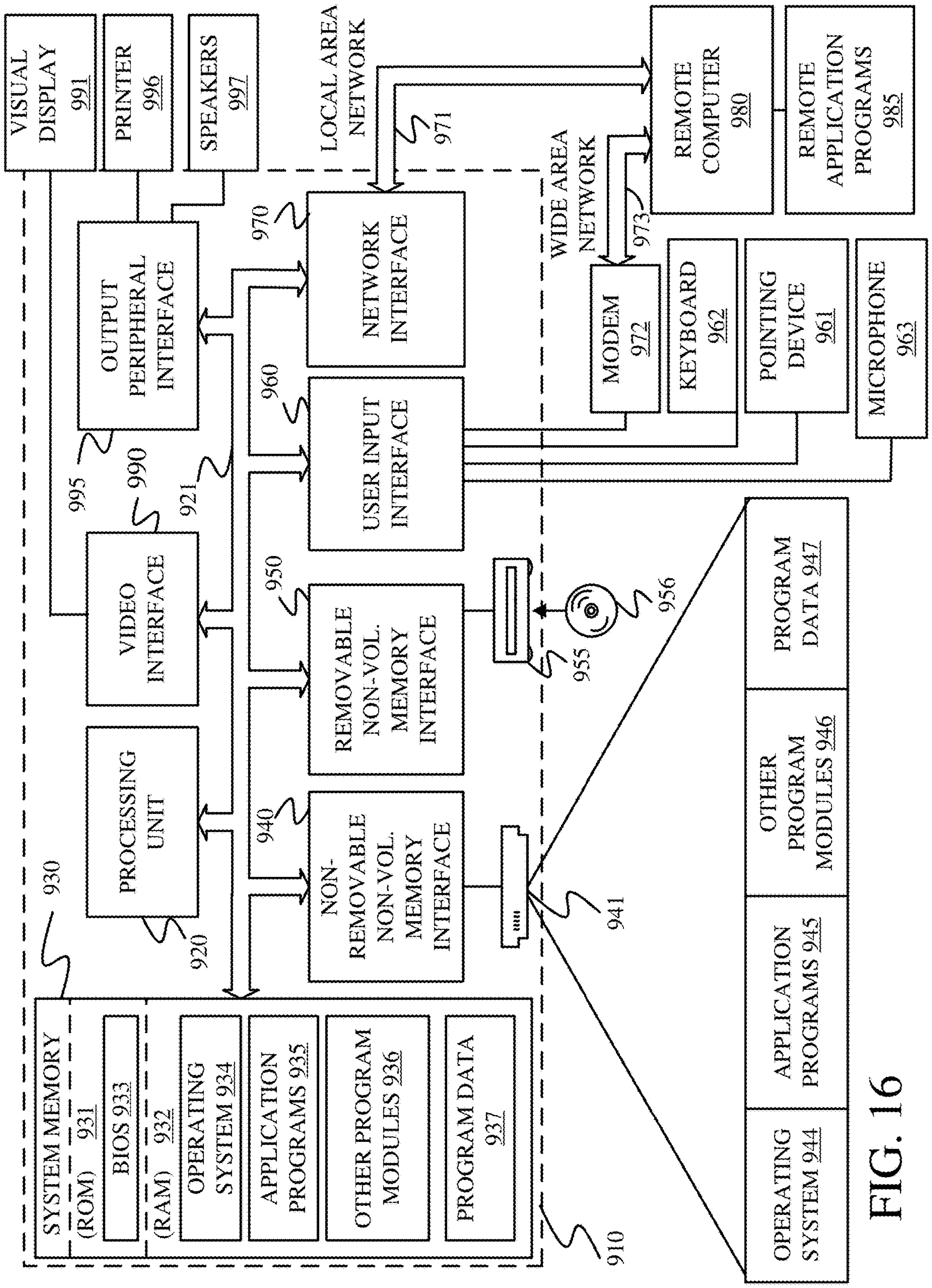
FIG. 16 is a block diagram showing one example of a computing environment that can be used in the architectures shown in the previous Figures.

FIG. 16 is one example of a computing environment in which elements of FIG. 6, or parts of it, (for example) can be deployed. With reference to FIG. 16, an example system for implementing some embodiments includes a computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 6 can be deployed in corresponding portions of FIG. 16.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random-access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 16 illustrates operating system 834, application programs 835, other program modules 836, and program data 837.

The computer 810 may also include other removable/non-removable volatile/nonvolatile computer storage media. By way of example only, FIG. 16 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 is typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 16, provide storage of computer readable instructions, data structures, program modules and other data for the computer 810. In FIG. 16, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network—WAN or a controller area network—CAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 16 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts mentioned above are disclosed as example forms of implementing the claims.

What is claimed is:

1. A system comprising:
- a paint spray gun comprising, a spray tip having a tip orifice;
- a pump comprising a reciprocating piston configured to pump paint along a flow path to the paint spray gun, wherein the spray tip atomizes the paint in an atomized spray pattern released from the tip orifice; and
- a controller configured to:
  - detect a reciprocation speed of the reciprocating piston;
  - determine a pressure of the paint along the flow path;
  - determine a flow rate of the paint along the flow path based on the reciprocation speed;
  - determine a current tip orifice size of the spray tip based on:
    - the flow rate and the pressure of the paint; and
- a mobile device configured to:
  - generate a comparison result based on comparing current tip orifice size to a first tip orifice size of the spray tip;
  - generate a wear value indicative of an amount of wear of the spray tip based on the comparison result; and
  - generate an output based on the wear value.

2. The system of claim 1, further comprising:
- a tip sensor configured to generate a tip sensor signal indicative of a characteristic of the spray tip, wherein the controller is configured to:
  - receive the tip sensor signal; and
  - determine the first tip orifice size of the spray tip based on the tip sensor signal.

3. The system of claim 2, wherein the tip sensor is configured to wirelessly communicate with a component of the spray tip and to generate the tip sensor signal based on wireless communication with the component of the spray tip.

4. The system of claim 3, wherein the component comprises an electromagnetic device disposed on the spray tip, and the tip sensor is coupled to the paint spray gun.

5. The system of claim 4, wherein the component comprises a radio frequency identification (RFID) tag.

6. The system of claim 2, wherein the tip sensor is coupled to the paint spray gun.

7. The system of claim 2, wherein the tip sensor comprises an optical sensor configured to optically read a code on the spray tip.

8. The system of claim 2, wherein the spray tip comprises a first spray tip, and the tip sensor signal uniquely identifies the first spray tip from a plurality of spray tips couplable to the paint spray gun.

9. The system of claim 1, further comprising:
- a wireless communicator communicatively coupled to the controller and configured to wirelessly receive one or more identification signals from a remote computing device that is remote from the pump, the one or more identification signals being indicative of:
  - a characteristic of the paint, and/or
  - a characteristic of the spray tip.

10. The system of claim 1, wherein the controller is configured to detect the reciprocation speed of the reciprocating piston based on a speed signal, and the flow rate of the paint is determined based on:
- the reciprocation speed of the reciprocating piston, and
- a displacement of the reciprocating piston.

11. The system of claim 10, wherein the speed signal indicates a speed of a motor that drives the pump.

12. The system of claim 1, further comprising:
- a motion sensor coupled to the paint spray gun and configured to generate a motion sensor signal indicative of a movement of the paint spray gun; and
- wherein the controller is configured to receive the motion sensor signal and control an operating characteristic of the pump based at least in part on the motion sensor signal.

13. The system of claim 1, wherein the controller is configured to:
- send a recommendation of an action to a user;
- receive a response to the recommendation from the user; and
- control an operating characteristic of the pump based on the response.

14. The system of claim 1, wherein the paint spray gun comprises a handheld paint spray gun having a handle and a user-actuatable trigger, and the system further comprises a hose that couples an outlet of the pump to an inlet of the handheld paint spray gun.

15. The system of claim 1, wherein the controller is configured to control the pump based on the wear value.

16. The system of claim 1, wherein the output comprises a display of the wear value.

17. The pan wing system of claim 16, wherein a representation of the wear value is displayed on a mobile phone.

18. A computer-implemented method comprising:
- determining a first tip orifice size of a spray tip of a paint spray gun, the spray tip having a tip orifice;
- operating a pump comprising a reciprocating piston to pump paint along a flow path to the spray tip which atomizes the paint in an atomized spray pattern released from the tip orifice;
- detecting a reciprocation speed of the reciprocating piston;
- determining a pressure of the paint along the flow path;
- determining a flow rate of the paint along the flow path based on the reciprocation speed;
- determining a current tip orifice size of the spray tip based on:
  - the flow rate and the pressure of the paint;
- generating a comparison result based on comparing the current tip orifice size to the first tip orifice size;
- generating a wear value indicative of an amount of wear of the spray tip based on the comparison result; and
- generating an output based on the wear value.

19. The computer-implemented method of claim 18, comprising detecting the reciprocation speed based on a speed signal, and determining the flow rate of the paint based on:
- the reciprocation speed of the reciprocating piston, and
- a displacement of the reciprocating piston.

20. The computer-implemented method of claim 19, wherein the speed signal indicates a speed of a motor that drives the pump.

21. The computer-implemented method of claim 18, wherein the paint spray gun comprises a handheld paint spray gun having a handle and a user-actuatable trigger, and a hose couples an outlet of the pump to an inlet of the handheld paint spray gun.

22. The computer-implemented method of claim 18, and comprising controlling the pump based on the wear value.

23. The computer-implemented method of claim 18, wherein the output comprises a display of the wear value.

24. The computer-implemented method of claim 18, wherein a representation of the wear value is displayed on a mobile phone.

* * * * *